(12) United States Patent
Hayakawa et al.

(10) Patent No.: US 6,333,820 B1
(45) Date of Patent: Dec. 25, 2001

(54) IMAGE DISPLAY APPARATUS

(75) Inventors: Kazuhito Hayakawa, Hachioji; Takayoshi Togino, Koganei; Koichi Takahashi, Hachioji, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/095,809

(22) Filed: Jun. 11, 1998

(30) Foreign Application Priority Data

Jun. 27, 1997 (JP) .................................................. 9-172169
Aug. 21, 1997 (JP) .................................................. 9-224706
Dec. 1, 1997 (JP) .................................................. 9-329835

(51) Int. Cl.[7] ............................ G02B 27/14; G02B 17/00
(52) U.S. Cl. ........................ 359/633; 359/630; 359/631; 359/729
(58) Field of Search ................................... 359/630, 631, 359/633, 727, 728, 729, 731, 732

(56) References Cited

U.S. PATENT DOCUMENTS 5,701,202 * 12/1997 Takahashi ............................. 359/631
5,859,624 * 1/1999 Matsumoto ............................... 345/8
5,886,822 * 3/1999 Spitzer .................................. 359/630

FOREIGN PATENT DOCUMENTS 07072446 3/1995 (JP).
07333551 12/1995 (JP).
08234137 9/1996 (JP).

\* cited by examiner

Primary Examiner—Georgia Epps
Assistant Examiner—Michael A. Lucas
(74) Attorney, Agent, or Firm—Pillsbury Winthrop LLP

(57) ABSTRACT

A compact, lightweight and bright image display apparatus which uses a non-telecentric optical system, or a decentered optical system and a reflection-type image display device, such as a reflection-type LCD, to have high optical performance. The image display apparatus comprises an image display device, and an ocular optical system which leads an image formed by the image display device to an eye point of an observer without forming an intermediate image so that the image can be observed as a virtual image. The ocular optical system comprises a decentered optical system having at least one decentered back-coated reflecting surface. The image display device is a reflection-type image display device which displays an image by reflection of illumination light. An illumination means for forming the illumination light is arranged outside an optical path between the reflection-type image display device and the eye point of the observer.

22 Claims, 26 Drawing Sheets

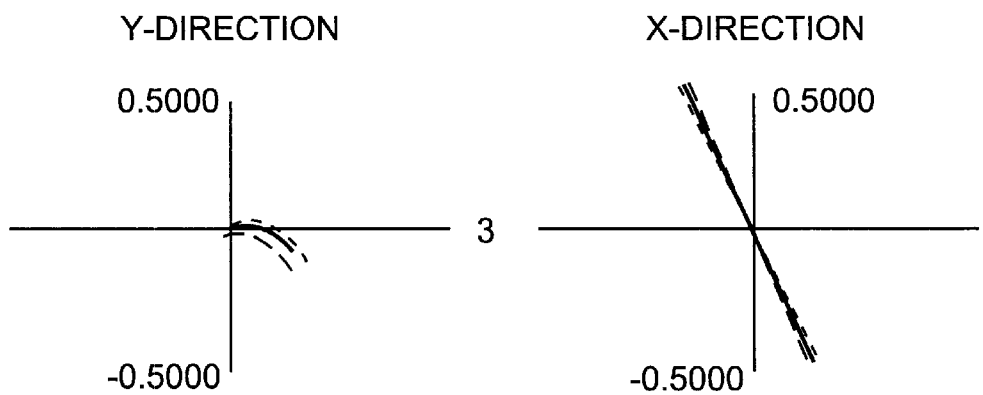
FIG. 29 (3)
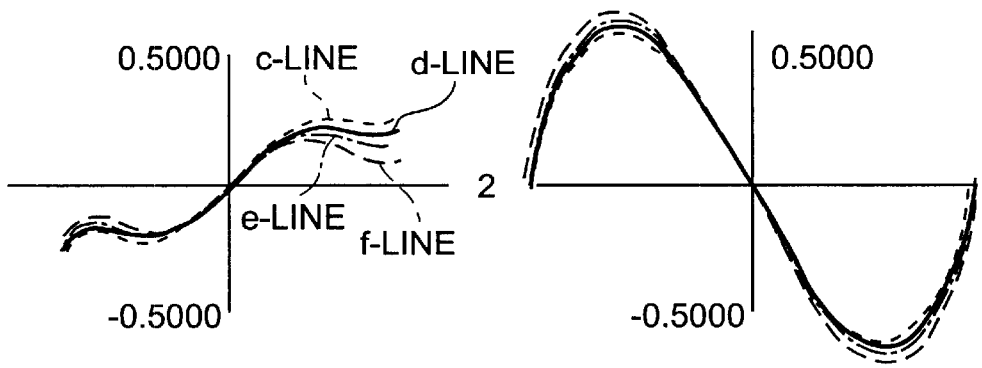
FIG. 29 (2)
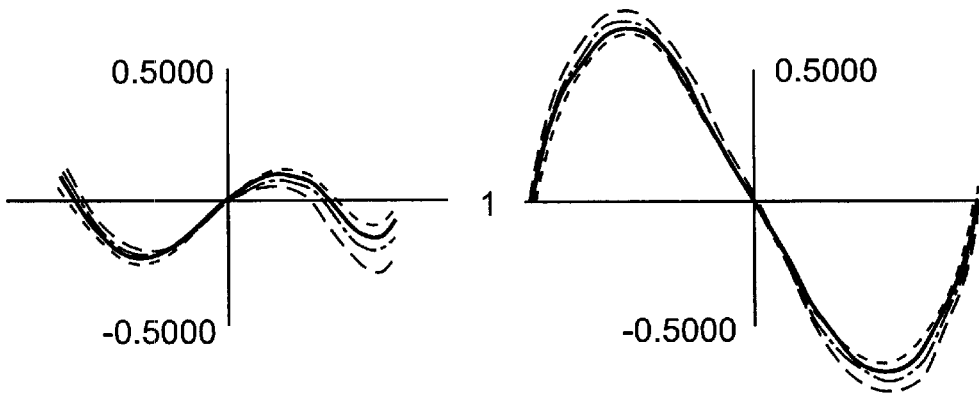
FIG. 29 (1)

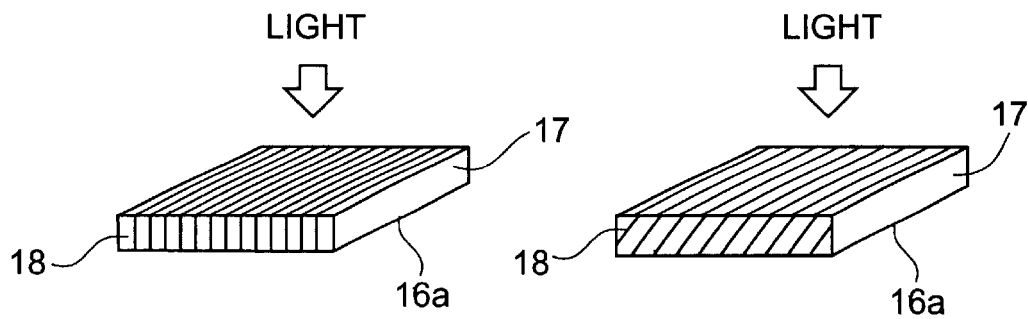
*FIG. 34(a)*      *FIG. 34(b)*
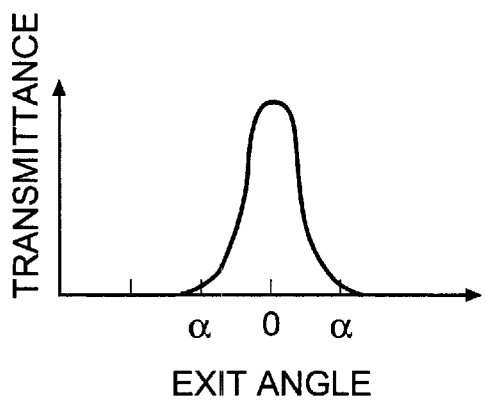 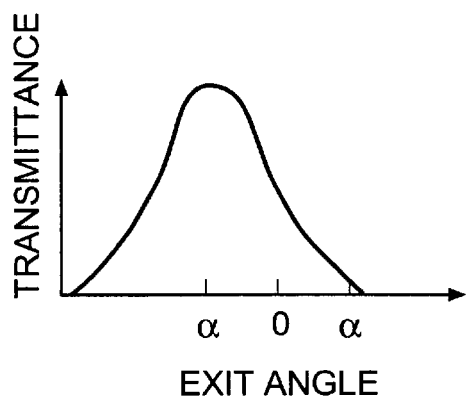
*FIG. 35(a)*      *FIG. 35(b)*

IMAGE DISPLAY APPARATUS

BACKGROUND OF THE INVENTION

1. Field of the Invention

The present invention relates to an image display apparatus and, more particularly, to a head- or face-mounted image display apparatus which is retained on a user's head or face to project an image into an observer's eyeball.

2. Description of the Related Art

In recent years, head- or face-mounted display apparatuses have been developed for the purpose of enabling the user to enjoy a wide-screen image personally.

In such circumstances, Japanese Patent Application Unexamined Publication (KOKAI) Nos. 7-333551 (1995) and 8-234137 (1996) propose an ocular optical system which leads to a position of an observer's eyeball an image formed by an image display device comprising a liquid crystal display (hereinafter called "LCD"). This ocular optical system is constructed by a decentered optical system made of a medium which is surrounded by three optical surfaces and has a refractive index larger than 1, wherein light rays emitted from the LCD enter the decentered optical system from a third surface, are totally reflected on a first surface inside, are reflected on a second surface forming a concave mirror, and exits through the first surface to the outside of the decentered optical system, thereby leading an image of the image display device to the observer's eyeball without forming an intermediate image.

Japanese Patent Application Unexamined Publication (KOKAI) Nos. 7-333551 (1995) and 8-234137 (1996) each employ a transmission-type LCD as the LCD constructing the image display apparatus. On the other hand, Japanese Patent Application Unexamined Publication (KOKAI) No.7-72446 (1995) proposes a face-mounted image display apparatus in which a reflection-type LCD is used as an image display device. FIG. 42 of the present application shows an optical system of the image display apparatus, in which light rays from a lamp light source 55 are made parallel rays by a collimator optical system 56, and part of the light rays (s-polarized light) are reflected by a polarization beam splitter 57 to illuminate a reflection-type LCD 58 from its front side. An image displayed on the reflection-type LCD 58 is projected by an optical system 59 onto a screen 52, and the projection image is observed by an observer through an ocular optical system 53.

In addition to the reflection-type LCD as the reflection-type image display device, an image display device called DMD (digital micro device) has also been proposed. This device has a structure shown in FIGS. 43(a) and 43(b). That is, FIG. 43(a) shows a plane view and FIG. 43(b) shows a structure of each element. In this structure, micro mirrors 60 corresponding to respective picture elements are arranged two-dimensionally. By tilting a mirror 60' at a designated position about its diagonal axis, light rays incident on the mirror 60' from a fixed direction are reflected in a direction different from the reflecting direction of the mirrors which are not tilted, thereby displaying a two-dimensional image. Each of the mirrors 60 is supported via hinges 63 at a pair of diagonally opposite corners by posts 62 set up on a substrate 61. Each of the mirrors 60 is rotatable about its diagonal axis between the hinges 63 by an electrostatic force generated by applying a voltage to one of a pair of electrodes 64 provided behind the mirrors 60 on the substrate 61 (IEEE Spectrum, Vol. 30, No. 11 pp. 27–31).

When a decentered optical system is employed as an optical system of an image display apparatus, there are the advantages that the whole apparatus can be made small and lightweight, keeping high optical performance (field angle, resolving power, etc.), and that the image display apparatus can display a bright image. Up to now, however, it has been intended to use only a transmission-type LCD as the image device for use with the decentered optical system. Therefore, each of the decentred optical systems disclosed in Japanese Patent Application Unexamined Publication (KOKAI) Nos. 7-333551 (1995) and 8-234137 (1996) has been constructed only as a telecentric optical system in which the position of an entrance pupil is set at an infinity point.

Further, the transmission-type LCD as an image display device has a lower vignetting factor of the picture element compared to the reflection-type LCD, and black matrices between the picture elements are conspicuously observed. Therefore, it is necessary to use a low pass filter (which cuts high spatial frequencies and passes low spatial frequencies) or the like so that the black matrices will not be conspicuously observed. On the other hand, in the reflection-type LCD, it is possible to make the vignetting factor of the picture elements higher, and the aforesaid problem is small. However, as disclosed in Japanese Patent Application Unexamined Publication (KOKAI) No. 7-72446 (1995), when a non-decentered optical system is used to observe an image, illumination must be made through an optical element such as a beam splitter. This is contrary to the requirement of miniaturization and weight reduction, and there remains a problem that a displayed image is dark.

SUMMARY OF THE INVENTION

The present invention has been made in view of these situations of the conventional techniques. An object of the present invention is to provide a decentered optical system which is constructed as a non-telecentric optical system in which the position of its entrance pupil is set at a finite point. A further object of the present invention is to provide a compact, lightweight and bright image display apparatus which has high optical performance by using a decentered optical system and a reflection-type image display device, such as a reflection-type LCD and a DMD.

To attain the aforesaid objects, an image display apparatus of the present invention comprises an image display device, and an ocular optical system which leads an image formed by the image display device to an eye point of an observer without forming an intermediate image so that the image can be observed as a virtual image, the ocular optical system comprising a decentered optical system having at least one decentered back-coated reflecting surface, and the decentered optical system being a non-telecentric optical system. In this case, it is preferable that the image display device is a reflection-type image display device which displays an image by reflection of illumination light, and that an illumination means for forming the illumination light is arranged outside an optical path between the reflection-type image display device and the eye point of the observer.

Further, it is preferable that the illumination means is arranged such that an incident angle of the illumination light with respect to a display surface of the reflection-type image display device equals approximately to an exit angle of a principal ray in display light which exits from the reflection-type image display device.

It is also preferable that the illumination means is arranged at a position which is approximately conjugate with a position of an entrance pupil of the decentered optical system.

It is also preferable that at least one reflecting surface of the decentered optical system is a rotationally asymmetric surface having no axis of rotational symmetry in nor outside the surface. In this case, it is preferable that the rotationally asymmetric surface is a plane-symmetry three-dimensional surface having only one plane of symmetry.

It is also preferable that the illumination means is arranged at a position in at least one of a first space between the display surface of the reflection-type image display device and a surface of the decentered optical system on which the display light will be incident, and a second space surrounding the first space, the position being outside the optical path so that the display light is not blocked. Furthermore, it is preferable that the illumination means is arranged at a position such that the display surface of the reflection-type image display device can be illuminated by the illumination light transmitted in at least one of the following ways: (a) through a part of the decentered optical system and (b) in a direction within the decentered optical system, where the display light from the reflection-type image display device will not pass.

In the present invention, the ocular optical system includes the decentered optical system having at least one decentered back-coated reflecting surface, the image display device includes the reflection-type image display device which displays an image by the reflection of the illumination light, and the illumination means for forming the illumination light is arranged outside the optical path between the reflection-type image display device and the eye point of the observer, thereby attaining a small, lightweight, and bright image display apparatus.

BRIEF DESCRIPTION OF THE DRAWINGS

FIGS. 29(1)–29(3) are graphs of transverse aberrations showing pupil aberrations of a surface illuminant according to example 3 of numerical values of the present invention.

FIGS. 34(a) and 34(b) are views showing louver optical elements.

FIGS. 35(a) and 35(b) are graphs showing distributions of transmittance of the louver optical elements shown in FIGS. 34(a) and 34(b).

DESCRIPTION OF THE PREFERRED EMBODIMENTS

The image display apparatus according to the present invention is described on the basis of some embodiments.

Figure 1:
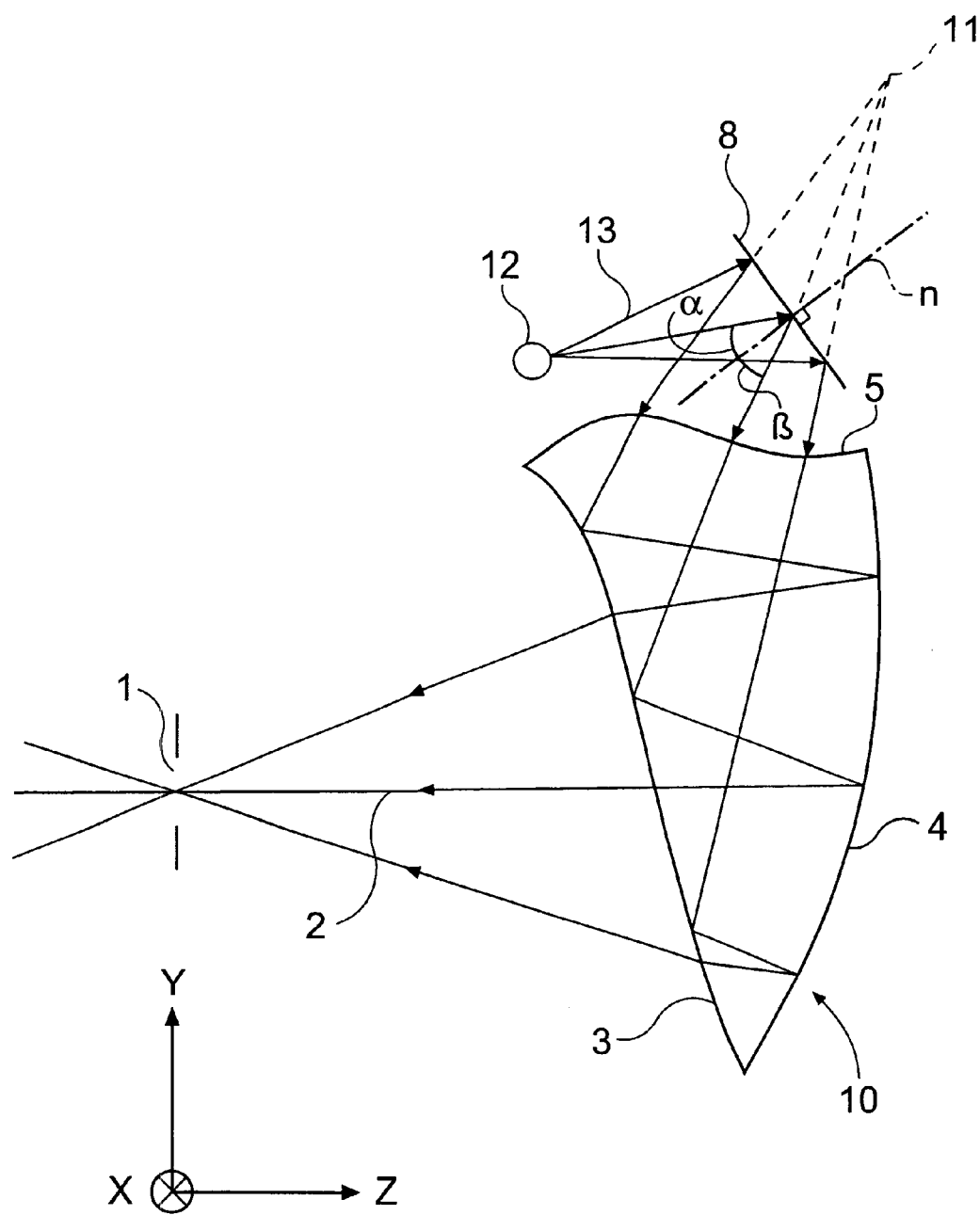
FIG. 1 is a ray path diagram of an image display apparatus according to an embodiment of the present invention.

FIG. 1 is a view of optical paths of an image display apparatus according to an embodiment of the present invention which uses as an ocular optical system of the image display apparatus a decentered optical system 10 formed by a medium having a refractive index larger than 1 and surrounded by three optical surfaces 3, 4 and 5. An exit pupil 1 of this decentered optical system is arranged at a position facing a first surface 3, and a reflection-type LCD 8 is arranged so as to face a third surface 5. The axial principal ray of the decentered optical system 10 is defined as a light ray which, in terms of backward tracing of light rays, passes trough the center of the exit pupil 1 and through the decentered optical system 10 and reaches the center of the picture surface of the reflection-type LCD 8. This axial principal ray is called an optical axis 2.

In this image display apparatus, light exiting from the reflection-type LCD 8 enters the decentered optical system 10 through the third surface 5, which is a transmitting surface, facing the reflection-type LCD 8. The light is reflected by the inner side of the first surface 3 facing the exit pupil 1, is incident on a second surface 4 positioned opposite the exit pupil 1 with respect to the first surface 3, and is reflected by the inner side of the second surface. The reflected light then passes through the first surface 3, exits from the decentered optical system 10, and enters a pupil of an observer, which is positioned at the exit pupil 1, without forming an intermediate image, thereby forming a retinal image on a retina of the observer. At least two reflecting surfaces are decentered with respect to the optical axis 2.

To correct aberrations caused by the decentration of the surfaces, it is desirable that mainly either or both of the reflecting surfaces 3 and 4 constructing the decentered optical system 10 have the positive refracting power for the action of the ocular optical system of the decentered optical system 10, and that at least one of the reflecting surfaces is in the form of a rotationally asymmetric surface. This is described below.

First, a coordinate system used in the following description is explained. With respect to the ray tracing, the backward tracing is used, that is, it is assumed that light rays from a far object point pass through the exit pupil 1 and form an image on the picture surface of the reflection-type LCD 8 as the image surface.

As shown in FIG. 1, an optical axis is defined by a straight line along which the axial principal ray that emanates from the center of the exit pupil 1 to reach the center of the picture surface in the reflection-type LCD 8, travels until it intersects the first surface 3 of the decentered optical system 10. The optical axis is defined as a Z-axis. An axis which perpendicularly intersects the Z-axis and which lies in a plane of decentration of each surface constituting the decentered optical system 10 is defined as a Y-axis. An axis which perpendicularly intersects both the Z-axis and the Y-axis is defined as an X-axis.

Generally, a spherical lens system constituted of spherical lenses only has a structure such that aberrations produced by a spherical surface, such as spherical aberration, coma, and field curvature, are mutually corrected by other surfaces to reduce aberrations as a whole. On the other hand, to correct aberrations sufficiently by a small number of surfaces, an a spherical surface and the like is employed. This is used to reduce a variety of aberrations produced by a spherical surface. However, in the decentered optical system, it is impossible to correct rotationally asymmetric aberrations, which are produced by decentration, by a rotationally symmetric a spherical surface.

Figure 39:
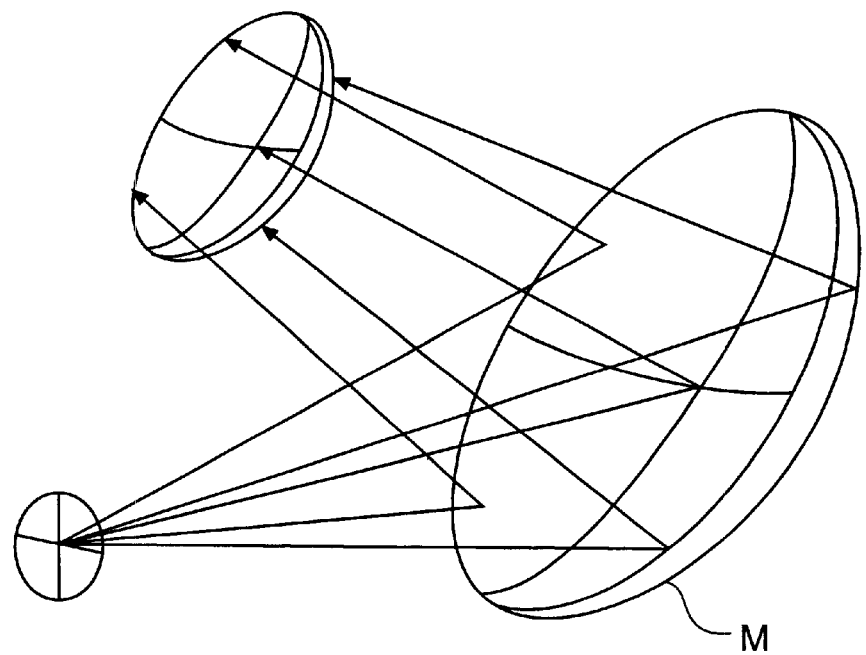
FIG. 39 is a view for explaining field curvature produced by a dicenteredly arranged concave mirror.
Figure 40:
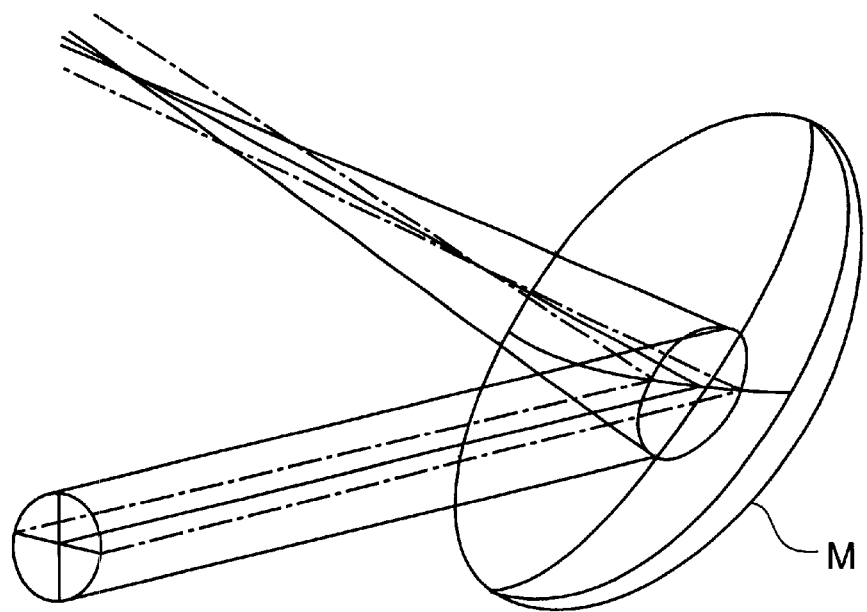
FIG. 40 is a view for explaining astigmatism produced by a dicenteredly arranged concave mirror.
Figure 41:
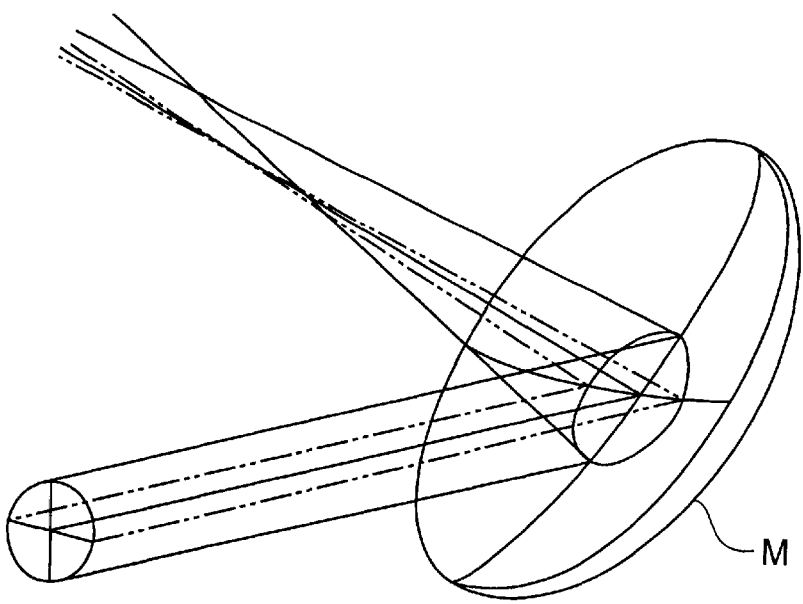
FIG. 41 is view for explaining axial coma aberration produced by a dicenteringly arranged concave mirror.
Figure 42:
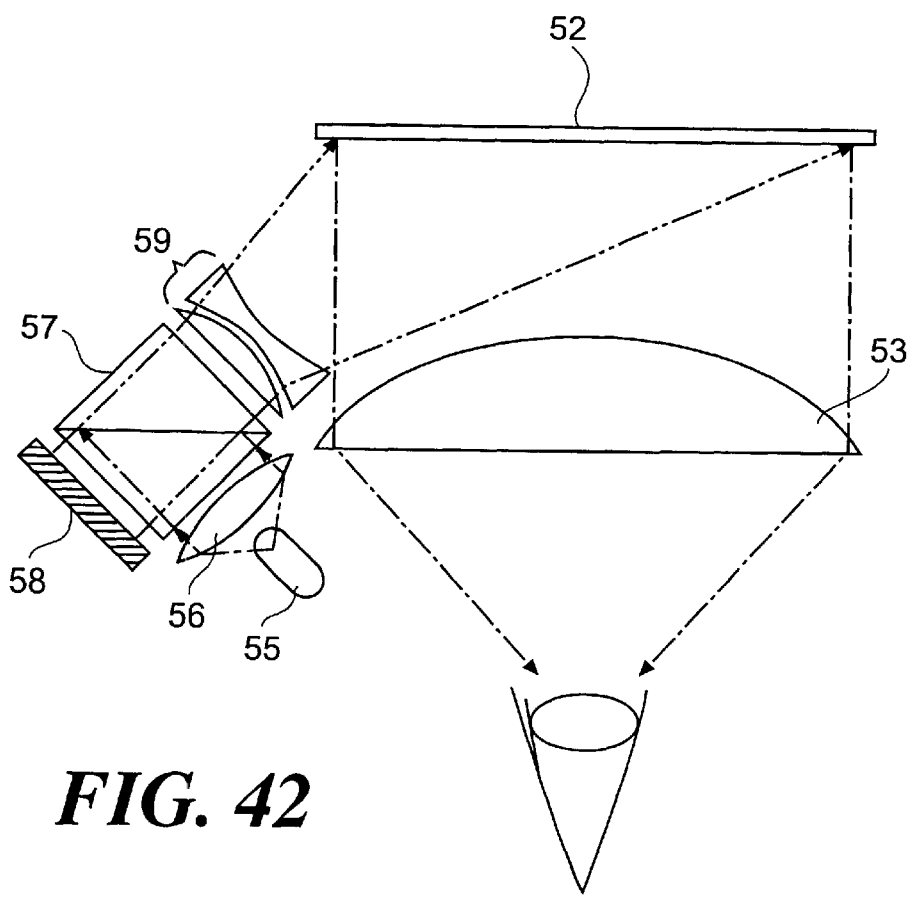
FIG. 42 is a view showing an optical system of a conventional image display apparatus employing a reflection-type LCD.

The rotationally asymmetric aberrations produced by the decentration include image distortion and field curvature, and further astigmatism and coma aberration which are also produced on the axis. FIG. 39 shows field curvature which is produced by a decenteredly arranged concave mirror M, FIG. 40 shows astigmatism which is produced by the decenteredly arranged concave mirror M, and FIG. 41 shows axial coma aberration which is produced by the decenteredly arranged concave mirror M. In the decentered optical system of the present invention, the rotationally asymmetric surface is arranged to correct the rotationally asymmetric aberrations produced by the decentration.

One of the rotationally asymmetric aberrations produced by the decenteredly arranged concave mirror is rotationally asymmetric field curvature. For example, light rays from an infinite object point impinge on the decentered concave mirror to form an image. After the light rays have impinged on the concave mirror, the backside focal length up to the image surface (reflection-type LCD 8) is half of the curvature of the part of the surface on which the light rays impinge. Accordingly, as shown in FIG. 39, an image surface tilted with respect to the axial principal ray is formed. It has been impossible to correct such rotationally asymmetric field curvature by the rotationally symmetric optical system. In order to correct this tilted field curvature, it is necessary to form the concave mirror M by a rotationally asymmetric surface. In this example, this tilted field curvature can be corrected by increasing the curvature (refracting power) in the positive direction of the Y-axis (upward direction in the figure), and by decreasing the curvature (refracting power) in the negative direction of the Y-axis (downward direction of the figure). Furthermore, in addition to the concave mirror M, it is necessary to arrange in the optical path a rotationally asymmetric surface having the same effect as the structure described above to obtain a flat image surface by a small number of surfaces.

Next, rotationally asymmetric astigmatism is described. Like the above explanation, with the concave mirror M decenteredly arranged, astigmatism as shown in FIG.40 is produced also with respect to the axial rays. In order to correct this astigmatism, like the above explanation, it is necessary to properly change the curvature in the X-axis direction and the curvature in the Y-axis direction of the non-rotational symmetric surface.

Then, rotationally asymmetric coma aberration is described. Like the above explanation, with the concave mirror M decenteredly arranged, the coma aberration is produced as shown in FIG. 41 also with respect to the axial rays. To correct this coma aberration, it is necessary to change the configuration of the rotationally asymmetric surface as the surface goes far from the origin of the X-axis and to properly change the configuration of the surface along the Y-axis.

If the decentered optical system is constructed so as to have a folded optical path, it is possible to make the reflecting surface have a power, and a transmission-type lens can be omitted. Moreover, the decentered optical system can be made small by folding the optical path.

If the reflecting surface is a totally reflecting surface tilted with respect to light rays so that the light rays are incident thereon at an angle exceeding the critical angle, a high reflectity can be obtained. Further, both of reflecting and transmitting actions can be obtained. Moreover, the reflecting surface is preferably a reflecting surface having a thin film of a metal, e.q. aluminum or silver, formed thereon, or a reflecting surface or a semitransparent reflecting surface formed from a dielectric multilayer film. In the case of a metal thin film having a reflecting action, a high reflectivity can be readily obtained. The use of a dielectric reflecting film is advantageous in a case where a reflecting film having wavelength selectivity and/or minimal absorption is to be formed.

More preferably, if a rotationally asymmetric surface is used for the reflecting surface, chromatic aberration is not produced at all, compared with the case in which it is used for the transmitting surface. Furthermore, because the light rays can be reflected even if the tilt of the surface is small, the other aberrations are little produced. That is, when the same refracting power is desired, the reflecting surface produces less aberrations than the refracting surface.

The rotationally asymmetric surface is an anamorphic surface, a toric surface, and a free form surface in a three dimensional space (hereinafter called "three dimensional surface"). The surface configuration of an anamorphic surface is represented by the following equation (a):

$$Z = (CX \cdot x^2 + CY \cdot y^2)/ \qquad (a)$$
$$\left[1 + \{1 - (1 + K_x)CX^2 \cdot x^2 - (1 + K_y)CY^2 \cdot y^2\}^{1/2}\right] +$$
$$\sum_{n=2} R_n \{(1 - P_n)x^2 + (1 + P_n)y^2\}^n$$

where Z is the amount of deviation from a plane tangent to the origin of the surface configuration; CX is the curvature in the X-axis direction; CY is the curvature in the Y-axis direction; $K_x$ is the conical coefficient in the Y-axis direction; $K_y$ is the conical coefficient in the Y-axis direction; $R_n$ is the rotationally symmetric component of the aspherical surface term; and Pn is the rotationally asymmetric component of the aspherical surface term.

The surface configuration of a toric surface is represented by the following equation (b):

$$Z = -\text{Sign}(Rx) \cdot \{(Rx - G(y))^2 - x^2\}^{1/2} + Rx \qquad (b)$$

where Z is the amount of deviation from a plane tangent to the origin of the surface configuration; Rx is the radius of curvature in the X-axis direction, Sign (Rx) is the sign of the radius of curvature in the X-axis direction, and G(y) is $$G(y) = CY \cdot y^2 / [1 + \{1 - (ak+1)CY^2 \cdot y^2\}^{1/2}] + \Sigma ac(n) \cdot y^n$$

where CY is the curvature in the Y-axis direction, ak is a conical coefficient, and ac(n) is aspherical coefficients.

The surface configuration of a three dimensional surface is represented by the following equation (c):

$$Z = C_2 + C_3 y + C_4 x + C_5 y^2 + C_6 yx + C_7 x^2 + C_8 y^3 + C_9 y^2 x + \qquad (c)$$
$$C_{10} yx^2 + C_{11} x^3 + C_{12} y^4 + C_{13} y^3 x + C_{14} y^2 x^2 + C_{15} yx^3 +$$
$$C_{16} x^4 + C_{17} y^5 + C_{18} y^4 x + C_{19} y^3 x^2 + C_{20} y^2 x^3 + C_{21} yx^4 +$$
$$C_{22} x^5 + C_{23} y^6 + C_{24} y^5 x + C_{25} y^4 x^2 + C_{26} y^3 x^3 + C_{27} y^2 x^4 +$$
$$C_{28} yx^5 + C_{29} x^6 + C_{30} y^7 + C_{31} y^6 x + C_{32} y^5 x^2 + C_{33} y^4 x^3 +$$
$$C_{34} y^3 x^4 + C_{35} y^2 x^5 + C_{36} yx^6 + C_{37} x^7$$

where Z is the amount of deviation from a plane tangent to the origin of the surface configuration, and Cm (mis an integer equal to or greater than 2) are coefficients.

In the decentered optical system of the present invention, it is preferable to use a plane-symmetry three-dimensional surface having only one plane of symmetry for at least one of the reflecting surfaces having the configurations of the decentered rotationally asymmetric surfaces. Generally, the three-dimensional surface represented by the above equation (c) do not have planes of symmetry identical with or parallel to the X-Z plane and the Y-Z plane. However, in the present invention, the three-dimensional surface is made to have only one plane of symmetry identical with or parallel to the Y-Z plane (plane of FIG. 1) by setting to 0 all the coefficients of the terms with odd-numbered powers of X. For example, in the above defining equation (a), it is possible to do so by setting to 0 the coefficients $C_4$, $C_6$, $C_9$, $C_{11}$, $C_{13}$, $C_{15}$, $C_{18}$, $C_{20}$, $C_{22}$, $C_{24}$, $C_{26}$, $C_{28}$, $C_{31}$, $C_{33}$, $C_{35}$, $C_{37}$, . . . of the respective terms.

Furthermore, by setting to 0 all the terms with odd-numbered powers of y, the three-dimensional surface is made to have only one plane of symmetry identical with or parallel to the X-Z plane.

Fore example, in the above defined equation (c), it can be made by setting to 0 the coefficients $C_3$, $C_6$, $C_8$, $C_{10}$, $C_{13}$, $C_{15}$, $C_{17}$, $C_{19}$, $C_{21}$, $C_{24}$, $C_{26}$, $C_{28}$, $C_{30}$, $C_{32}$, $C_{34}$, $C_{36}$, . . . of the respective terms. Since the three-dimensional surface has the plane of symmetry as described above, its productivity can be improved.

By making the three-dimensional surface have either of the plane of symmetry identical with or parallel to the Y-Z plane and the plane of symmetry identical with or parallel to the X-z plane, the rotationally asymmetric aberrations produced by the decentration can be effectively corrected. The above defining equation is shown as an example and naturally the same effect can also be obtained for any other defining equations.

Generally, it is difficult to produce the decentered optical system (decentered prism optical system) having the decentered rotationally asymmetric reflecting surfaces by polishing, and therefore it is manufactured by injection molding of plastics or molding of glass. In this case, it is necessary to confirm whether the surfaces of the decentered prism optical system have been formed in predetermined configurations. For measuring such three-dimensional rotationally asymmetric configurations, a three-dimensional coordinates measuring instrument is used. However, it takes long time to measure.

Therefore, at least one of the surfaces constituting the decentered prism optical system is preferably a spherical surface or a rotationally symmetric surface formed by a rotationally symmetric aspherical surface.

In the embodiment shown in FIG. 1 according to the present invention, since the reflection-type LCD 8 is employed as the image display device, it is necessary to emit illumination light 13 to a display surface of the reflection-type LCD 8. Accordingly, in this embodiment, a point-like light source 12 is arranged at a position in at least one of a first space between the third surface 5 and the reflection-type LCD 8, and a second space surrounding the first space, the position being outside the optical path so that display light is not blocked by the light source 12.

Moreover, the light source 12 is arranged at a position in a mirror image relationship with an entrance pupil 11 of the decentered optical system 10 with respect to the display surface (if the surfaces of picture elements are not arranged in parallel to the display surface, the surfaces of the picture elements) of the reflection-type LCD 8. When arranged in such a positional relationship, an incident angle α of the illumination light 13 from the light source 12 becomes approximately equal to an exit angle β of the principal light ray of the display light from the reflection-type LCD 8 (the angle formed by the principal light ray of the display light with respect to a normal n to the display surface or the surface of the picture element), and bright display can be obtained. The position of the entrance pupil 11 is conjugate to the position of the exit pupil 1 with respect to the decentered optical system 10.

Figure 2:
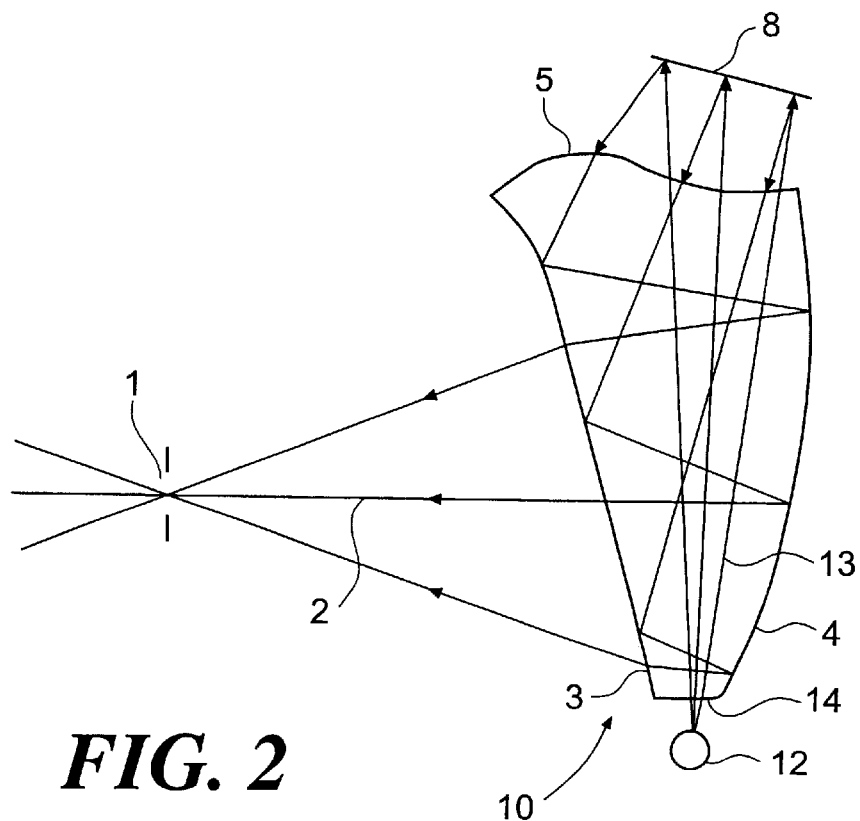
FIG. 2 is a ray path diagram of a variation of the image display apparatus shown in FIG. 1.
Figure 3:
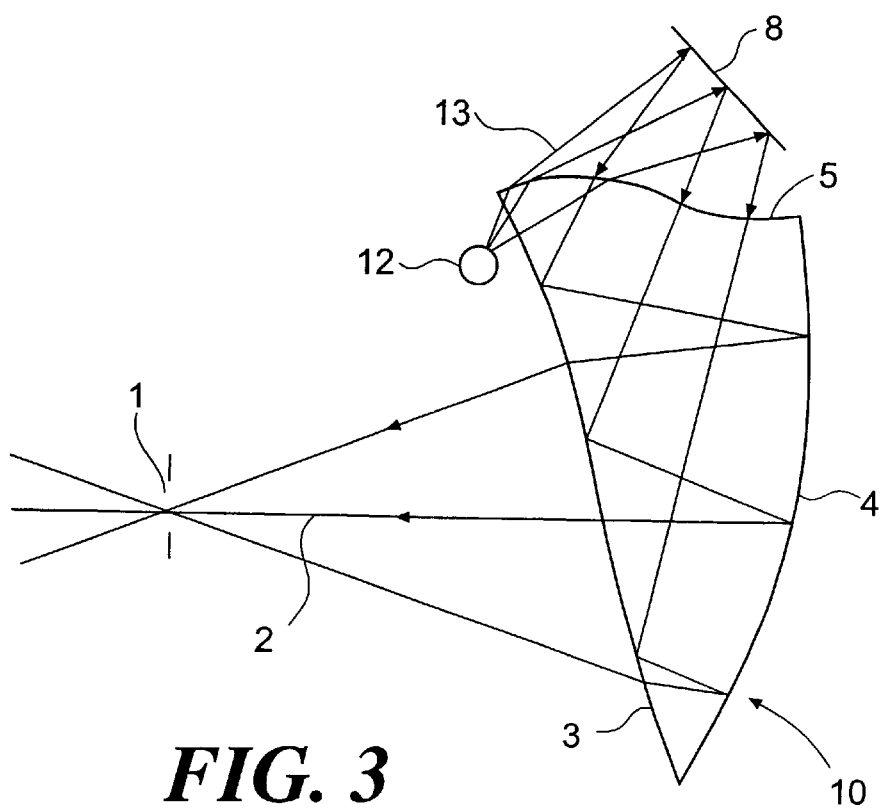
FIG. 3 is a ray path diagram of another image display apparatus modified from FIG. 1.

In addition to the position as shown in FIG. 1 and described above, the light source 12 can also be arranged at positions as shown in FIG. 2 and FIG. 3 such that the display surface (the surfaces of the picture elements) of the reflection-type LCD 8 can be illuminated by the illumination light transmitted through a part of the decentered optical system 10 where the display light from the reflection-type LCD 8 will not pass.

In the constitution shown in FIG. 2, a part of the decentered optical system 10 is cut out in a position opposite to the third surface 5 and where the first surface 3 and the second surface 4 intersect, and the light source 12 is arranged in front of the cutout surface 14. The illumination light 13 from the light source 12 enters the decentered optical system 10 through the cutout surface 14, passes through the decentered optical system 10, and exits from the third surface 5 to illuminate the display surface of the reflection-type LCD 8.

In the constitution shown in FIG. 3, the light source 12 is arranged in front of the first surface 3 and near the intersection of the first surface 3 and the third surface 5. The illumination light 13 from the light source 12 enters the decentered optical system 10 near the intersection of the first surface 3 and the third surface 5, passes through the decentered optical system 10, and exits from the third surface 5 thereby illuminating the display surface of the reflection-type LCD 8.

In both constitutions, the illumination light 13 passes through the decentered optical system 10. However, since the illumination light 13 is transmitted through a part or in a direction, where the display light from the reflection-type LCD 8 will not pass, the light source 12 does not interfere with the display, and the illumination light 13 does not become flare or the like.

As described above, the decentered optical system 10 as shown in FIG. 1 is used as the ocular optical system. Normal n' is defined as an image, projected onto the Y-Z plane, of the normal n to the display surface or the picture element surface of the reflection-type LCD 8, and the angle formed by the axial principal ray (defined above) and the normal n' is denoted by Θ. Discussion will be made on the conditions of this angle Θ when the illumination light source 12 is arranged at the positions shown in FIGS. 1, 2 and 3.

First, in the case of the arrangement as shown in FIG. 2 and described above, 1 it is preferable to satisfy the following:

$$15° < Θ < 25° \tag{1}$$

If the angle Θ in the above conditional formula (1) is over the upper limit of 25°, it is necessary for the illumination light to reflect on the first reflecting surface 4 in terms of the backward ray tracing in order to illuminate the reflection-type LCD 8, so that the illumination tends to be uneven. Further, since the first reflecting surface 4 has the power of the illumination system as well as the imaging system, it is not preferable from the point of view of aberrational correction. If the angle Θ is under the lower limit of 15°, it is necessary for the illumination light to reflect on the second surface 3 in terms of the backward ray tracing in order to illuminate the reflection-type LCD 8, so that it becomes difficult to arrange the light source 12 under the decentered optical system 10 (opposite to the reflection-type LCD 8) as shown in FIG. 2.

Next, in the case of the arrangement as shown in FIG. 1 and described above, it is preferable to satisfy the following:

$$20° < Θ < 33° \tag{2}$$

If the angle Θ in the above conditional formula (2) is over the upper limit of 33°, the field curvature in the Y-direction of the decentered optical system 10 is too large to be corrected. This is not desirable from the point of view of aberrational correction. Furthermore, if the angle Θ is under the lower limit of 20°, the optical path of the illumination system overlaps with the second transmitting surface 5 in terms of the backward ray tracing, so that it becomes difficult to arrange the light source 12 at a position in at least one of the first space between the third surface 5 and the reflection-type LCD 8, and the second space surrounding the first space, the position being outside the optical path so that the display light is not blocked, as shown in FIG. 1.

In the case of the arrangement as shown in FIG. 3 and described above, it is preferable to satisfy the following:

$$8° < Θ < 20° \tag{3}$$

If the angle Θ in the conditional formula (3) is over the upper limit of 20°, the optical path of the illumination system becomes outside the second transmitting surface 5 in terms of the backward ray tracing, so that it is difficult to make the illumination arrangement as shown in FIG. 3. Moreover, if the angle Θ is under the lower limit of 820 , the light source 12 is arranged in the optical path between the plane of the exit pupil 1 and the first surface 3, so that a midair image as a primary object is blocked by the light source 12 and cannot be observed.

In the foregoing embodiments, the decentered optical system 10 as shown in FIG. 1 is used. However, in addition to this constitution, various types of decentered optical system 10 can be used as the ocular optical system of the present invention. These types will be described below. Also in these decentered optical systems 10, at least one reflecting surface is decentered with respect to the optical axis, and any or all of reflecting surfaces constituting the decentered optical system 10 mainly have the positive power for the action of the ocular optical system. And at least one of the reflecting surfaces has a configuration of one of the rotationally asymmetric surfaces: the anamorphic surface, the toric surface, and the three-dimensional surface. It is preferable to use a plane-symmetry three-dimensional surface having only one plane of symmetry for at least one of the reflecting surfaces in the form of the decentered rotationally asymmetric surfaces. Furthermore, at least one of the surfaces constituting the decentered optical system 10 is preferably a spherical surface or a rotationally symmetric surface formed by a rotationally symmetric aspherical surface.

Figure 4:
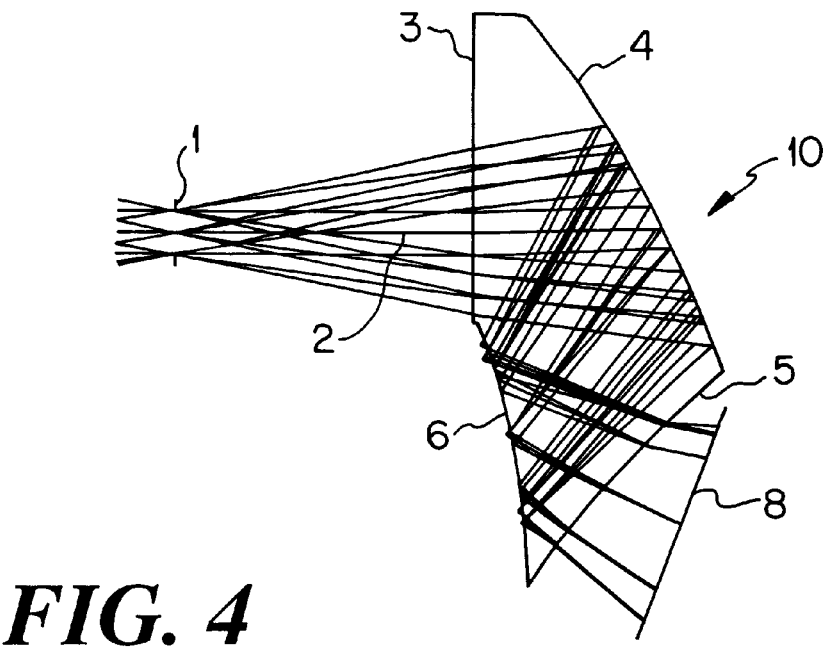
FIG. 4 is a ray path diagram of a decentered optical system applicable to the image display apparatus according to the present invention.

A decentered optical system 10 as shown in FIG. 4 comprises four surfaces: first, second, third and fourth surfaces 3, 4, 5 and 6, and the space between these surfaces is filled with a medium having a refractive index larger than 1. Display light from a reflection-type LCD 8 enters the decentered optical system 10 through the third surface 5 which is a transmitting surface facing the reflection-type LCD 8, and is reflected by the forth surface 6 which is a reflecting surface. Next, the light impinges on and is reflected by the second surface 4 which is a reflecting surface arranged on an optical axis 2 decenteredly and opposite to an exit pupil 1. The reflected light passes through the first surface 3 arranged on the optical axis 2 between the second surface 4 and the exit pupil 1 and exits from the decentered optical system 10. The light goes along the optical axis 2 and enters a pupil of an observer positioned at the exit pupil 1 without forming an intermediate image, thereby forming a display image on a retina of the observer.

Figure 5:
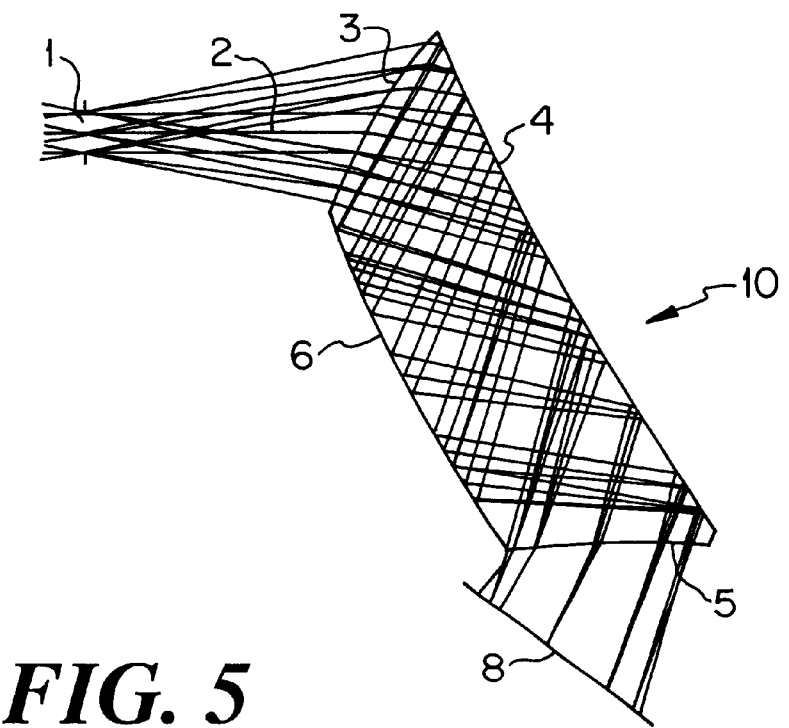
FIG. 5 is a ray path diagram of another decentered optical system applicable to the image display apparatus according to the present invention.

A decentered optical system 10 as shown in FIG. 5 comprises four surfaces: first, second, third and fourth surfaces 3, 4, 5 and 6, and the space between these surfaces is filled with a medium having a refractive index larger than 1. Display light from a reflection-type LCD 8 enters the decentered optical system 10 through the third surface 5 which is a transmitting surface facing the reflection-type LCD 8, and impinges on and is reflected by the second surface 4 which is a reflecting surface arranged on an optical axis 2 decenteredly and opposite to an exit pupil 1. After the reflection, the light is reflected by the fourth surface 6 which is a reflecting surface, and impinges on and is reflected by the second surface 4. The reflected light passes through the first surface 3 arranged on the optical axis 2 between the second surface 4 and the exit pupil 1 and exits from the decentered optical system 10. The light goes along the optical axis 2 and enters a pupil of an observer positioned at the exit pupil 1 without forming an intermediate image, thereby forming a display image on a retina of the observer.

Figure 6:
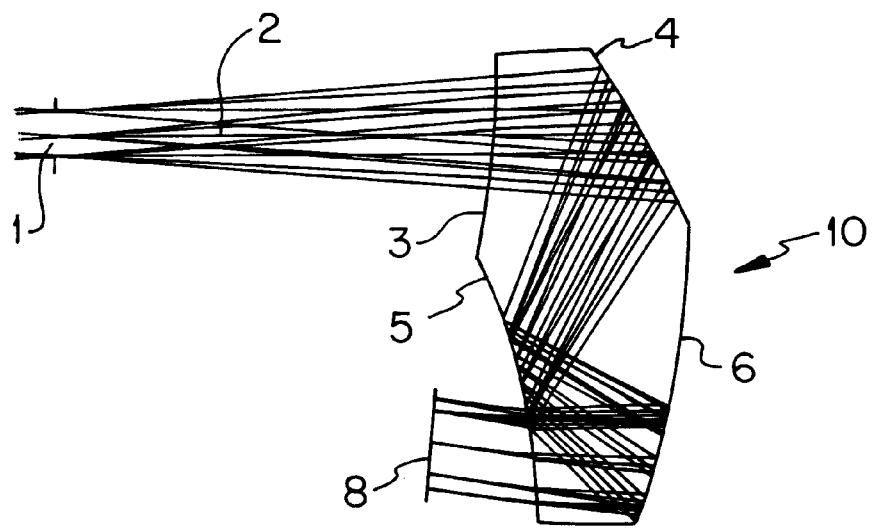
FIG. 6 is a ray path diagram of yet another decentered optical system applicable to the image display apparatus according to the present invention.

A decentered optical system 10 shown in FIG. 6 comprises four surfaces: first, second, third and fourth surfaces 3, 4, 5 and 6, and the space between these surfaces is filled with a medium having a refractive index larger than 1. Display light from a reflection-type LCD 8 enters the decentered optical system 10 through the third surface 5 which is a transmitting surface facing the reflection-type LCD 8, and is reflected by the forth surface 6 which is a reflecting surface. Next, the light impinges on and is reflected by the third surface 5. Then, the light impinges on and is reflected by the second surface 4 which is a reflecting surface arranged on an optical axis 2 decenteredly and opposite to an exit pupil 1. The reflected light passes through the first surface 3 arranged on the optical axis 2 between the second surface 4 and the exit pupil 1 and exits from the decentered optical system 10. The light goes along the optical axis 2 and enters a pupil of an observer positioned at the exit pupil 1 without forming an intermediate image, thereby forming a display image on a retina of the observer.

Figure 7:
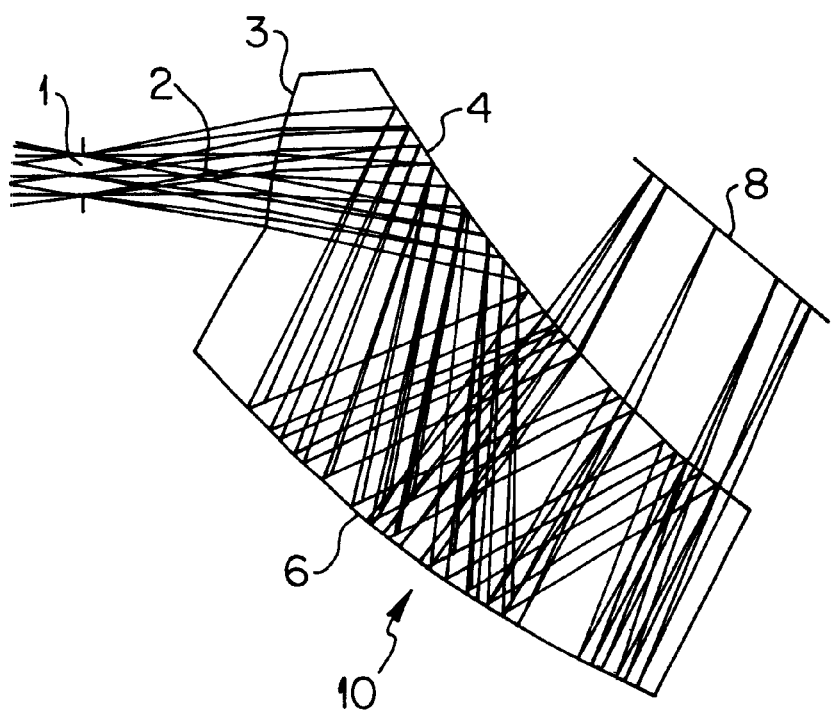
FIG. 7 is a ray path diagram of still another decentered optical system applicable to the image display apparatus according to the present invention.

A decentered optical system 10 as shown in FIG. 7 comprises three surfaces: first, second and fourth surfaces 3, 4 and 6, and the space between these surfaces is filled with a medium having a refractive index larger than 1. Display light from a reflection-type LCD 8 enters the decentered optical system 10 through the second surface 4 which faces the reflection-type LCD 8 and is arranged on an optical axis 2 decenteredly and opposite to an exit pupil 1. Then the light is reflected by the fourth surface 6 which is a reflecting surface, and impinges on and is reflected by the second surface 4. The light is reflected again by the fourth surface 6 and impinges on and is reflected again by the second surface 4. The reflected light passes through the first surface 3 arranged on the optical axis 2 between the second surface 4 and the exit pupil 1 and exits from the decentered optical system 10. The light goes along the optical axis 2 and enters a pupil of an observer positioned at the exit pupil 1 without forming an intermediate image, thereby forming a display image on a retina of the observer.

Figure 8:
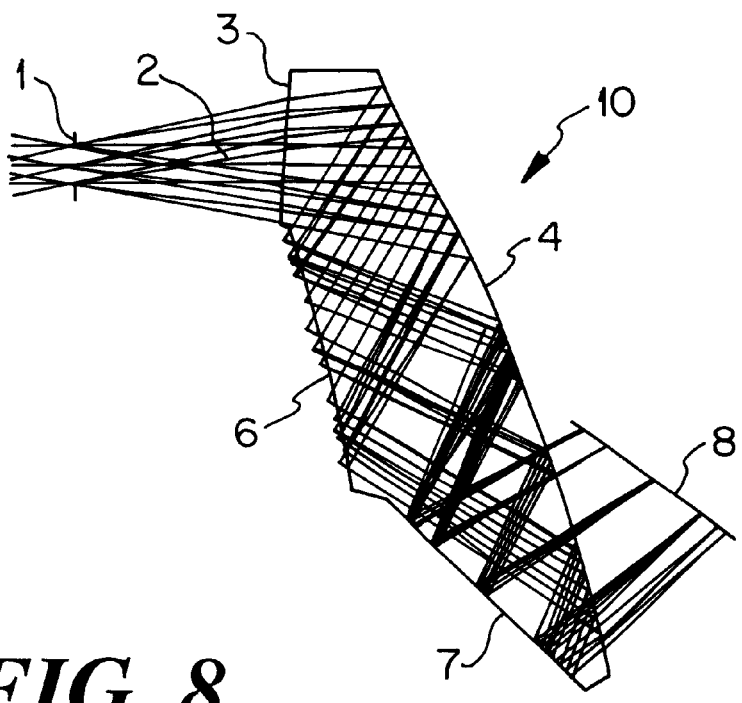
FIG. 8 is a ray path diagram of yet another decentered optical system applicable to the image display apparatus according to the present invention.

A decentered optical system 10 shown in FIG. 8 comprises four surfaces: first, second, fourth and fifth surfaces 3, 4, 6 and 7, and the space between these surfaces is filled with a medium having a refractive index larger than 1. Display light from a reflection-type LCD 8 enters the decentered optical system 10 through the second surface 4 which faces the reflection-type LCD 8 and is arranged on an optical axis 2 decenteredly and opposite to an exit pupil 1. Then the light is reflected by the fifth surface 7 which is a reflecting surface, and impinges on and is reflected by the second surface 4. Further, the light is reflected by the fourth surface 6 which is a reflecting surface, and impinges on and is reflected again by the second surface 4. The reflected light passes through the first surface 3 arranged on the optical axis 2 between the second surface 4 and the exit pupil 1 and exits from the decentered optical system 10. The light goes along the optical axis 2 and enters a pupil of an observer positioned at the exit pupil 1 without forming an intermediate image, thereby forming a display image on a retina of the observer.

Figure 9:
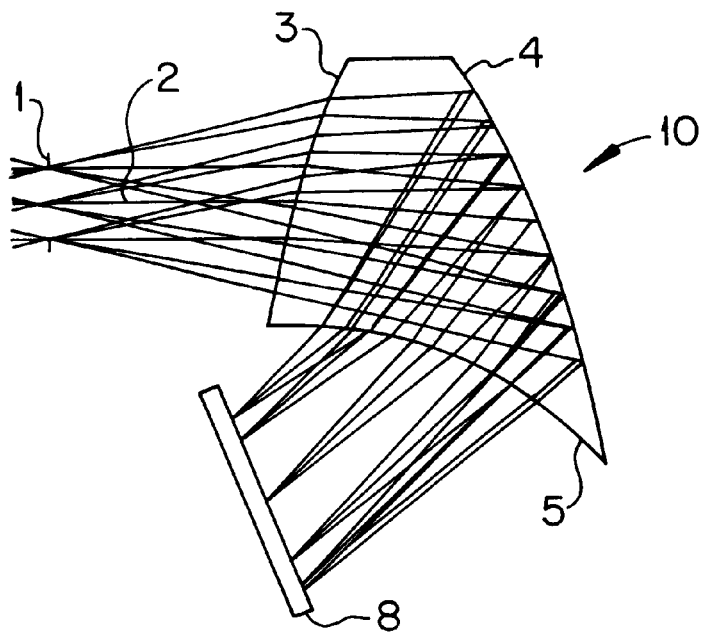
FIG. 9 is a ray path diagram of still another decentered optical system applicable to the image display apparatus according to the present invention.

A decentered optical system 10 shown in FIG. 9 comprises three surfaces: first, second and third surfaces 3, 4 and 5, and the space between these surfaces is filled with a medium having a refractive index larger than 1. Display light from a reflection-type LCD 8 enters the decentered optical system 10 through the third surface 5 which is a transmitting surface facing the reflection-type LCD 8. Next, the light impinges on and is reflected by the second surface 4 which is a reflecting surface arranged on an optical axis 2 decenteredly and opposite to an exit pupil 1. The reflected light passes through the first surface 3 arranged on the optical axis 2 between the second surface 4 and the exit pupil 1 and exits from the decentered optical system 10. The light goes along the optical axis 2 and enters a pupil of an observer positioned at the exit pupil 1 without forming an intermediate image, thereby forming a display image on a retina of the observer.

Figure 10:
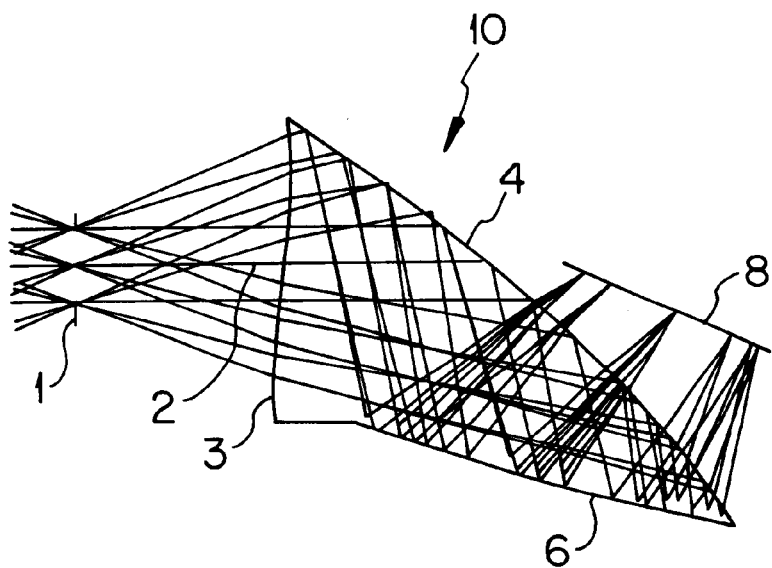
FIG. 10 is a ray path diagram of another decentered optical system applicable to the image display apparatus according to the present invention.

A decentered optical system 10 shown in FIG. 10 comprises three surfaces: first, second and fourth surfaces 3, 4 and 6, and the space between these surfaces is filled with a medium having a refractive index larger than 1. Display light from a reflection-type LCD 8 enters the decentered optical system 10 through the second surface 4 which faces the reflection-type LCD 8 and is arranged on an optical axis 2 decenteredly and opposite to an exit pupil 1. Then the light is reflected by the fourth surface 6 which is a reflecting surface, and impinges on and is reflected by the second surface 4. The reflected light passes through the first surface 3 arranged on the optical axis 2 between the second surface 4 and the exit pupil 1 and exits from the decentered optical system 10. The light goes along the optical axis 2 and enters a pupil of an observer positioned at the exit pupil 1 without forming an intermediate image, thereby forming a display image on a retina of the observer.

Figure 11:
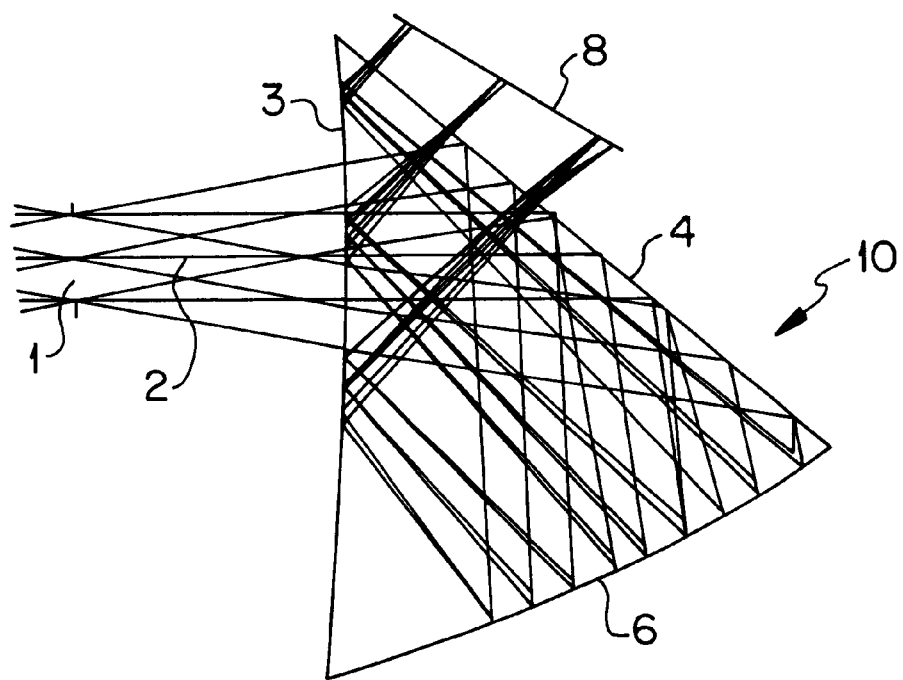
FIG. 11 is a ray path diagram of another decentered optical system applicable to the image display apparatus according to the present invention.

A decentered optical system 10 shown in FIG. 11 comprises three surfaces: first, second and fourth surfaces 3, 4 and 6, and the spaces between these surfaces is filled with a medium having a refractive index larger than 1. Display light from a reflection-type LCD 8 enters the decentered optical system 10 through the second surface 4 which faces the reflection-type LCD 8 and is arranged on an optical axis 2 decenteredly and opposite to an exit pupil 1. Then the light is reflected by the first surface 3 arranged on the optical axis 2 between the second surface 4 and the exit pupil 1. Further, the light is reflected by a fourth surface 6 which is a reflecting surface, and impinges on and is reflected by the second surface 4. The reflected light passes through the first surface 3 and exits from the decentered optical system 10. The light goes along the optical axis 2 and enters a pupil of an observer positioned at the exit pupil 1 without forming an intermediate image, thereby forming a display image on a retina of the observer.

Figure 12:
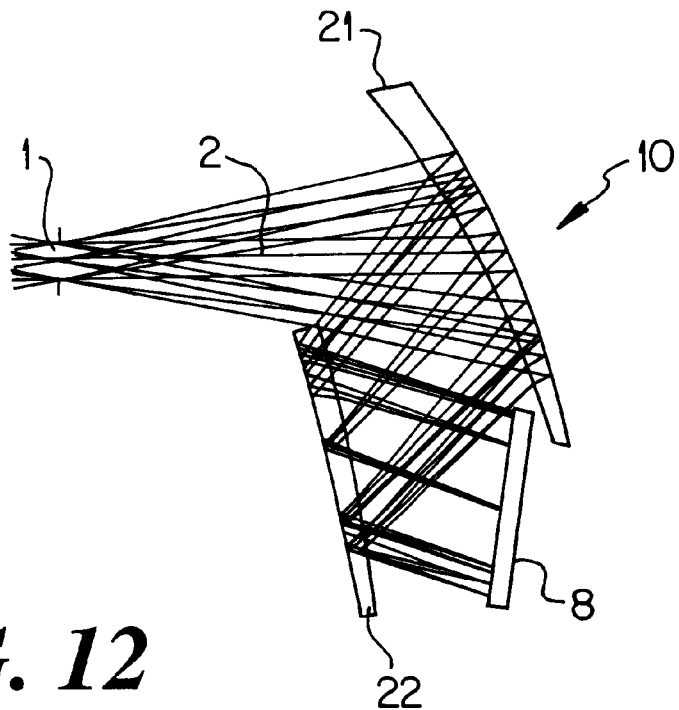
FIG. 12 is a ray path diagram of another decentered optical system applicable to the image display apparatus according to the present invention.

A decentered optical system 10 shown in FIG. 12 comprises first and second back-surface mirrors 21 and 22. Display light from a reflection-type LCD 8 enters the decentered optical system 10 by passing through the front surface of the second back-surface mirror 22 facing the reflection-type LCD 8, is reflected by the back surface of the second back-surface mirror 22 and passes through its front surface. Next, the light passes through the front surface of the first back-surface mirror 21 arranged on the optical axis 2 decenteredly and opposite to an exit pupil 1, is reflected by its back surface and passes through its front surface. The light exits from the decentered optical system 10, goes along the optical axis 2, and enters a pupil of an observer positioned at the exit pupil 1 without forming an intermediate image, thereby forming a display image on a retina of the observer.

Figure 13:
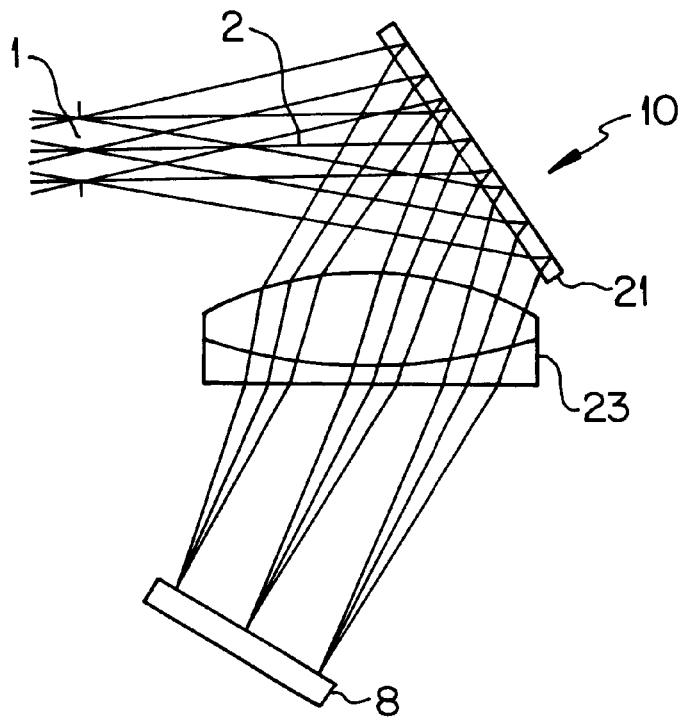
FIG. 13 is a ray path diagram of another decentered optical system applicable to the image display apparatus according to the present invention.

A decentered optical system 10 shown in FIG. 13 comprises an optical element (cemented lens) 23 having a positive refracting power, and a concave back-surface mirror 21. Display light from a reflection-type LCD 8 enters the decentered optical system 10 through the optical element 23 facing the reflection-type LCD 8. Then the light passes through the front surface of the concave back-surface mirror 21 arranged on an optical axis 2 decenteredly and opposite to an exit pupil 1, and is reflected by its back surface and passes through its front surface. The light exits from the decentered optical system 10 and goes along the optical axis 2, and enters a pupil of an observer positioned at the exit pupil 1 without forming an intermediate image, thereby forming an display image on a retina of the observer.

Figure 14:
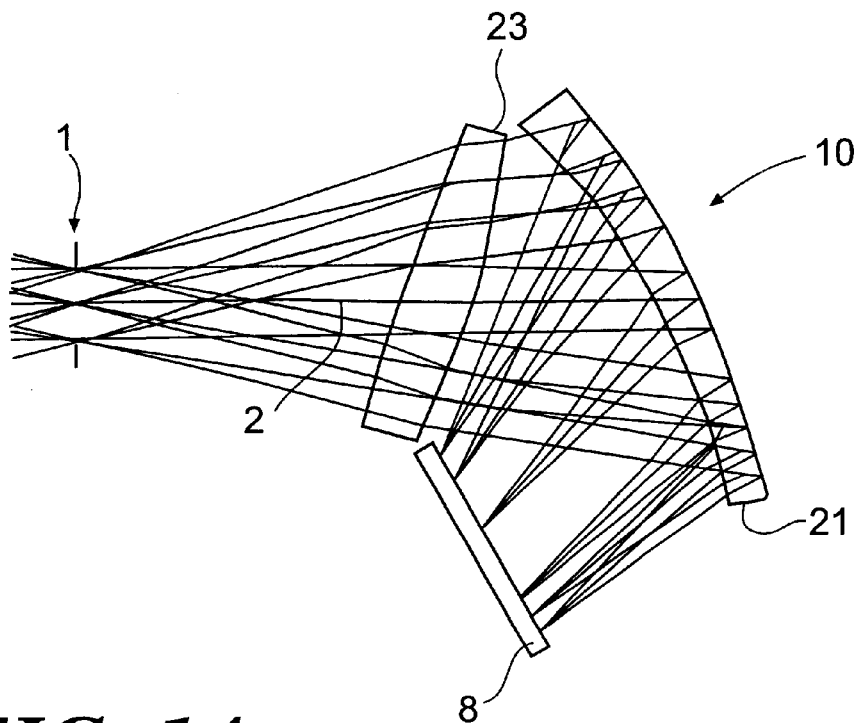
FIG. 14 is a ray path diagram of another decentered optical system applicable to the image display apparatus according to the present invention.

A decentered optical system 10 shown in FIG. 14 comprises a concave back-surface mirror 21 and an optical element (single lens) 23 having a positive refracting power. Display light from a reflection-type LCD 8 enters the decentered optical system 10 through the front surface of the concave back-surface mirror 21 facing the reflection-type LCD 8, is reflected by the back surface of the concave back-surface mirror 21 and passes through its front surface. Next, the light passes through the optical element 23 arranged on an optical axis 2 decenteredly and opposite to an exit pupil 1 and exits from the decentered optical system 10. The light goes along the optical axis 2 and enters a pupil of an observer positioned at the exit pupil 1 without forming an intermediate image, thereby forming an display image on a retina of the observer.

Figure 15:
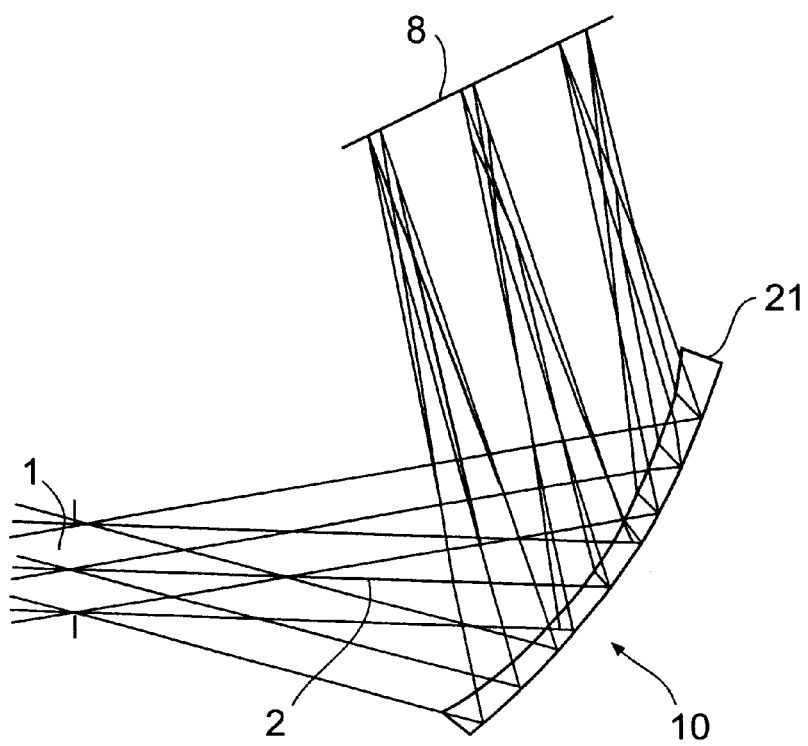
FIG. 15 is a ray path diagram of another decentered optical system applicable to the image display apparatus according to the present invention.

A decentered optical system 10 shown in FIG. 15 comprises a concave back-surface mirror 21 arranged decenteredly. Display light from a reflection-type LCD 8 passes through the front surface of the concave back-surface mirror 21, is reflected by its back surface and passes through its front surface. The light exits from the decentered optical system 10, goes along an optical axis 2 and enters a pupil of an observer positioned at an exit pupil 1 without forming an intermediate image, thereby forming an display image on a retina of the observer.

Figure 16:
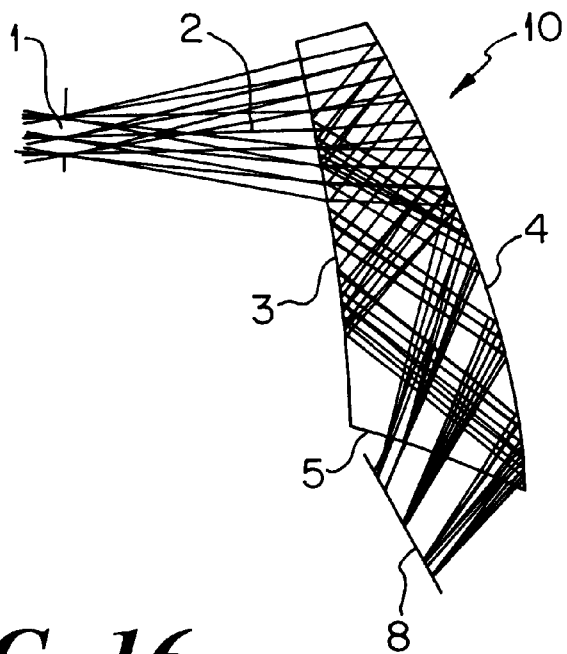
FIG. 16 is a ray path diagram of another decentered optical system applicable to the image display apparatus according to the present invention.

A decentered optical system 10 shown in FIG. 16 comprises three surfaces: first, second and third surfaces 3, 4 and 5, and the space between these surfaces is filled with a medium having a refractive index larger than 1. Display light from a reflection-type LCD 8 enters the decentered optical system 10 through the third surface 5 which is a transmitting surface facing the reflection-type LCD 8. Then the light is reflected by the second surface 4 which is a reflecting surface, and impinges on and is reflected by the first surface 3 arranged on an optical axis 2 decenteredly and opposite to an exit pupil 1. The reflected light impinges on and is reflected by the second surface 4 again. Then the light passes through the first surface 3 arranged on the optical axis 2 between the second surface 4 and the exit pupil 1, and exits from the decentered optical system 10. The light goes along the optical axis 2 and enters a pupil of an observer positioned at the exit pupil 1 without forming an intermediate image, thereby forming a display image on a retina of the observer.

Figure 17:
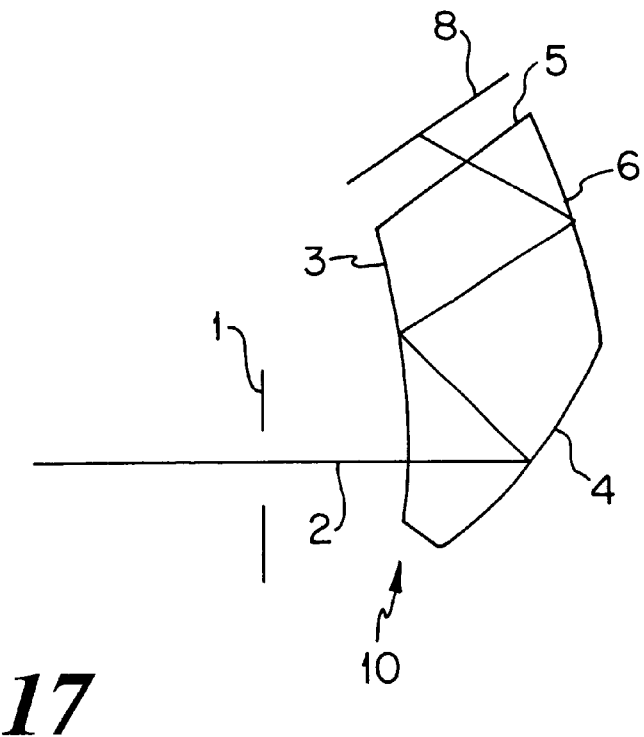
FIG. 17 is a ray path diagram of another decentered optical system applicable to the image display apparatus according to the present invention.

A decentered optical system 10 shown in FIG. 17 comprises four surfaces: first, second, third and fourth surfaces 3, 4, 5 and 6, and the space between these surfaces is filled with a medium having a refractive index larger than 1. Display light from a reflection-type LCD 8 enters the decentered optical system 10 through the third surface 5 which is a transmitting surface facing the reflection-type LCD 8. Then the light is reflected by the fourth surface 6 which is a reflecting surface, and impinges on and is reflected by the first surface 3 arranged on an optical axis 2 decenteredly and opposite to an exit pupil 1. The reflected light impinges on and is reflected by the second surface 4. Then the light passes through the first surface 3 arranged on the optical axis 2 between the second surface 4 and the exit pupil 1, and exits from the decentered optical system 10. The light goes along the optical axis 2 and enters a pupil of an observer positioned at the exit pupil 1 without forming an intermediate image, thereby forming a display image on a retina of the observer.

Figure 18:
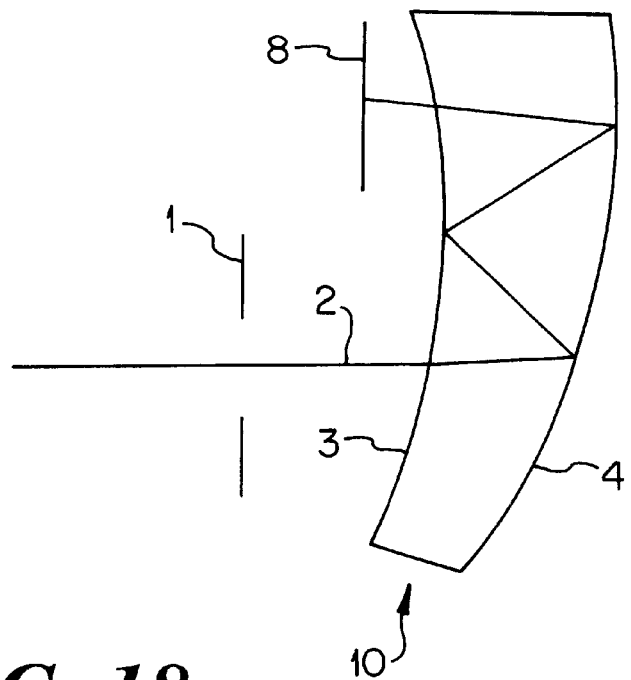
FIG. 18 is a ray path diagram of another decentered optical system applicable to the image display apparatus according to the present invention.

A decentered optical system 10 shown in FIG. 18 comprises two surfaces: first and second surfaces 3 and 4, and the space between these surfaces is filled with a medium having a refractive index larger than 1. Display light from a reflection-type LCD 8 enters the decentered optical system 10 through the first surface 3 facing the reflection-type LCD 8, and is reflected by the second surface 4 which is a reflecting surface. The reflected light impinges on and is reflected by the first surface 3 and again impinges on and is reflected by the second surface 4. Then the light passes through the first surface 3 arranged on an optical axis 2 between the second surface 4 and an exit pupil 1, and exits from the decentered optical system 10. The light goes along the optical axis 2 and enters a pupil of an observer positioned at the exit pupil 1 without forming an intermediate image, thereby forming a display image on a retina of the observer.

Figure 19:
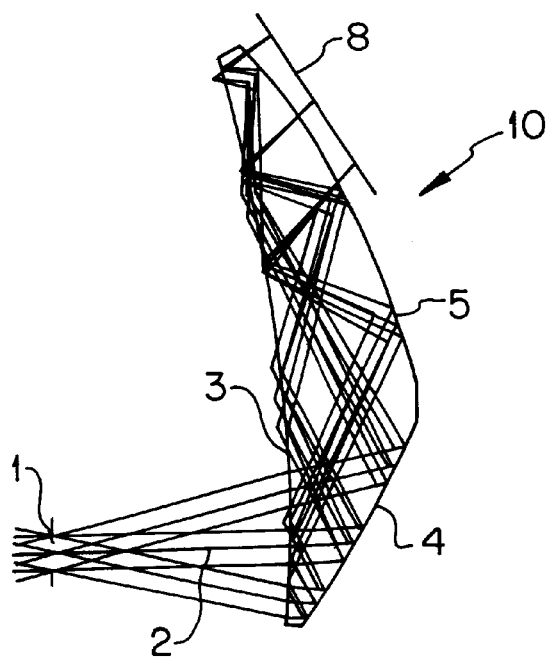
FIG. 19 is a ray path diagram of another decentered optical system applicable to the image display apparatus according to the present invention.

A decentered optical system 10 shown in FIG. 19 comprises three surfaces: first, second and third surfaces 3, 4 and 5, and the space between these surfaces is filled with a medium having a refractive index larger than 1. Display light from a reflection-type LCD 8 enters the decentered optical system 10 through the third surface 5 which is a transmitting surface facing the reflection-type LCD 8, and is reflected by the first surface 3 arranged on an optical axis 2 and opposite to an exit pupil 1. Then the light impinges on and is reflected by the third surface 5, and is reflected again by the first surface 3. The reflected light impinges on and is reflected by the second surface 4. The light passes through the first surface arranged on the optical axis 2 between the second surface 4 and the exit pupil 1, and exits from the decentered optical system 10. The light goes along the optical axis 2 and enters a pupil of an observer positioned at the exit pupil 1 without forming an intermediate image, thereby forming a display image on a retina of the observer.

Figure 20:
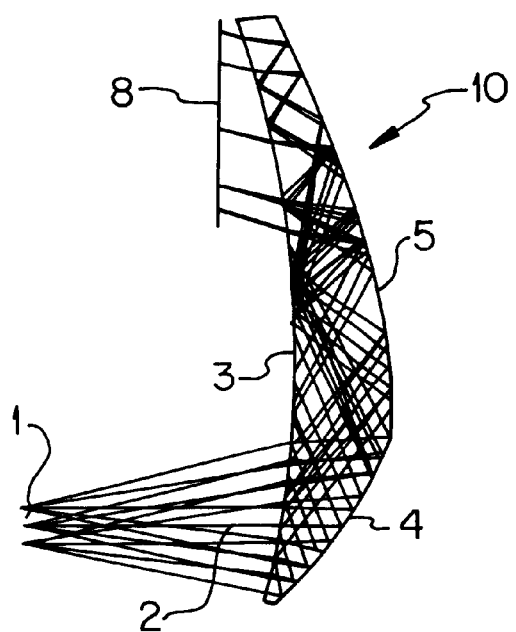
FIG. 20 is a ray path diagram of another decentered optical system applicable to the image display apparatus according to the present invention.

A decentered optical system 10 shown in FIG. 20 comprises three surfaces: first, second and third surfaces 3, 4 and 5, and the space between these surfaces is filled with a medium having a refractive index larger than 1. Display light from a reflection-type LCD 8 enters the decentered optical system 10 through the first surface 3 facing the reflection-type LCD 8, and impinges on and is reflected by the third surface 5. Then the light again impinges on and is reflected by the first surface 3, and is reflected again by the third surface 5. The reflected light is further reflected by the first surface 3 and impinges on and reflected by the second surface 4. The light passes through the first surface 3 arranged on an optical axis 2 between the second surface 4 and an exit pupil 1, and exits from the decentered optical system 10. The light goes along the optical axis 2 and enters a pupil of an observer positioned at the exit pupil 1 without forming an intermediate image, thereby forming a display image on a retina of the observer.

Figure 21:
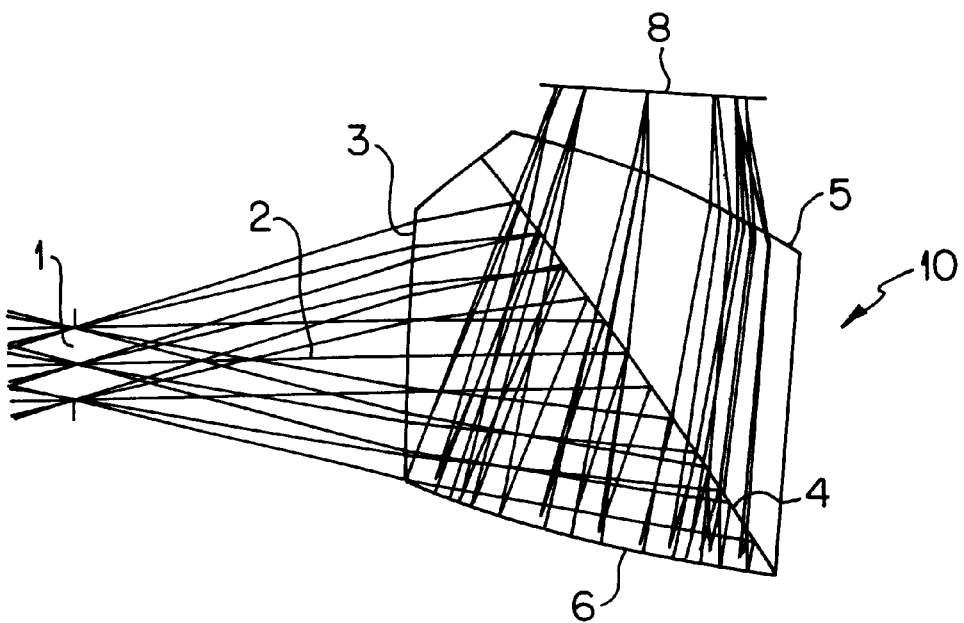
FIG. 21 is a ray path diagram of another decentered optical system applicable to the image display apparatus according to the present invention.

A decentered optical system 10 shown in FIG. 21 comprises four surfaces: first, second, third and fourth surfaces 3, 4, 5 and 6, and the space between these surfaces is filled with a medium having a refractive index larger than 1. The second surface 4 is a decentered semitransparent reflecting surface provided in the medium. Display light from a reflection-type LCD 8 enters the decentered optical system 10 through the third surface 5 facing the reflection-type LCD 8, and passes through the second surface 4. Then the light is reflected by the fourth surface 6, and impinges on and is reflected by the second surface 4. The reflected light passes through the first surface 3 arranged on an optical axis 2 between the second surface 4 and an exit pupil 1, and exits from the decentered optical system 10. The light goes along the optical axis 2 and enters a pupil of an observer positioned at the exit pupil 1 without forming an intermediate image, thereby forming a display image on a retina of the observer.

Figure 22:
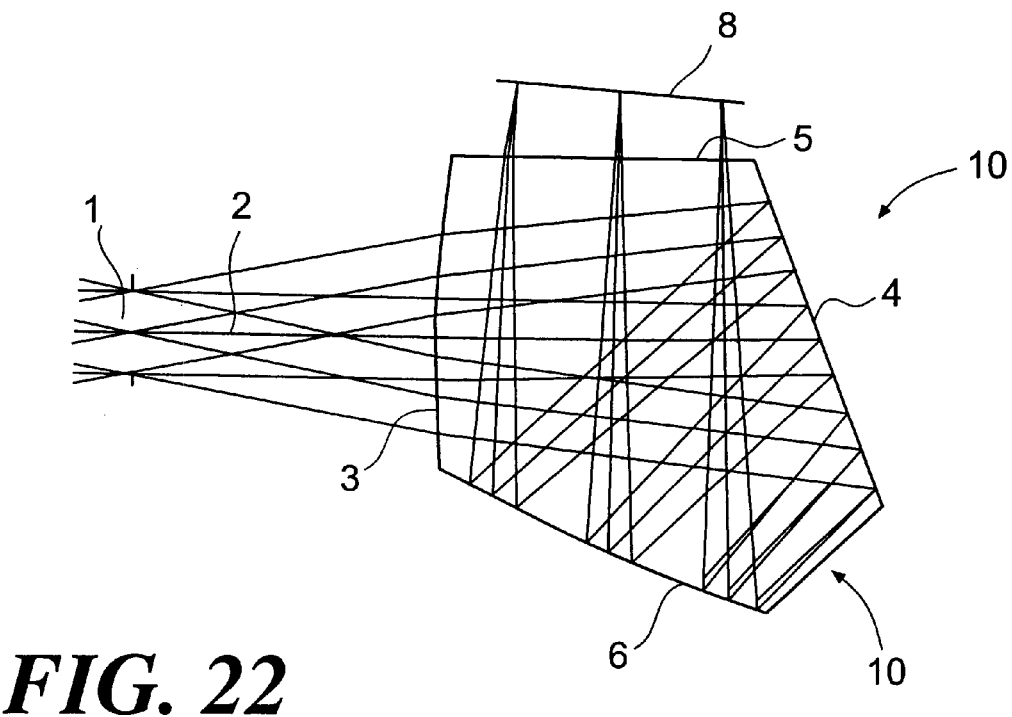
FIG. 22 is a ray path diagram of another decentered optical system applicable to the image display apparatus according to the present invention.

A decentered optical system 10 shown in FIG. 22 comprises four surfaces: first, second, third and fourth surfaces 3, 4, 5 and 6, and the space between these surfaces is filled with a medium having a refractive index larger than 1. Display light from a reflection-type LCD 8 enters the decentered optical system 10 through the third surface 5 facing the reflection-type LCD 8, and is reflected by the fourth surface 6. The reflected light impinges on and is reflected by the second surface 4, and crosses the optical paths from the third surface 5 to the fourth surface 6. Then the light passes through the first surface 3 arranged on an optical axis 2 between the second surface 4 and an exit pupil 1, and exits from the decentered optical system 10. The light goes along the optical axis 2 and enters a pupil of an observer positioned at the exit pupil 1 without forming an intermediate image, thereby forming a display image on a retina of the observer.

Figure 23:
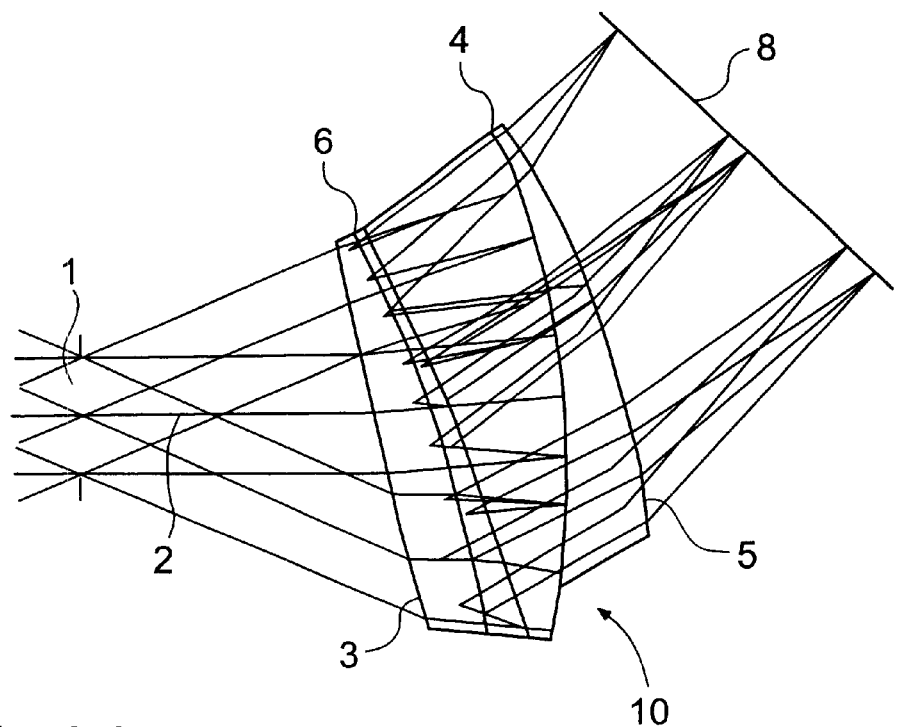
FIG. 23 is a ray path diagram of another decentered optical system applicable to the image display apparatus according to the present invention.

A decentered optical system 10 shown in FIG. 23 comprises four surfaces: first, second, third and fourth surfaces 3, 4, 5 and 6, and the space between these surfaces is filled with a medium having a refractive index larger than 1. The second and fourth surfaces 4 and 6 are decentered semi-transparent reflecting surfaces provided in the medium. Display light from a reflection-type LCD 8 enters the decentered optical system 10 through the third surface 5 facing the reflection-type LCD 8, and passes through the second surface 4. Then the light is reflected by the fourth surface 6, and impinges on and is reflected by the second surface 4. The reflected light passes through the fourth surface 6 and the first surface 3 arranged on an optical axis 2 between the second surface 4 and an exit pupil 1, and exits from the decentered optical system 10. The light goes along the optical axis 2 and enters a pupil of an observer positioned at the exit pupil 1 without forming an intermediate image, thereby forming a display image on a retina of the observer.

Figure 24:
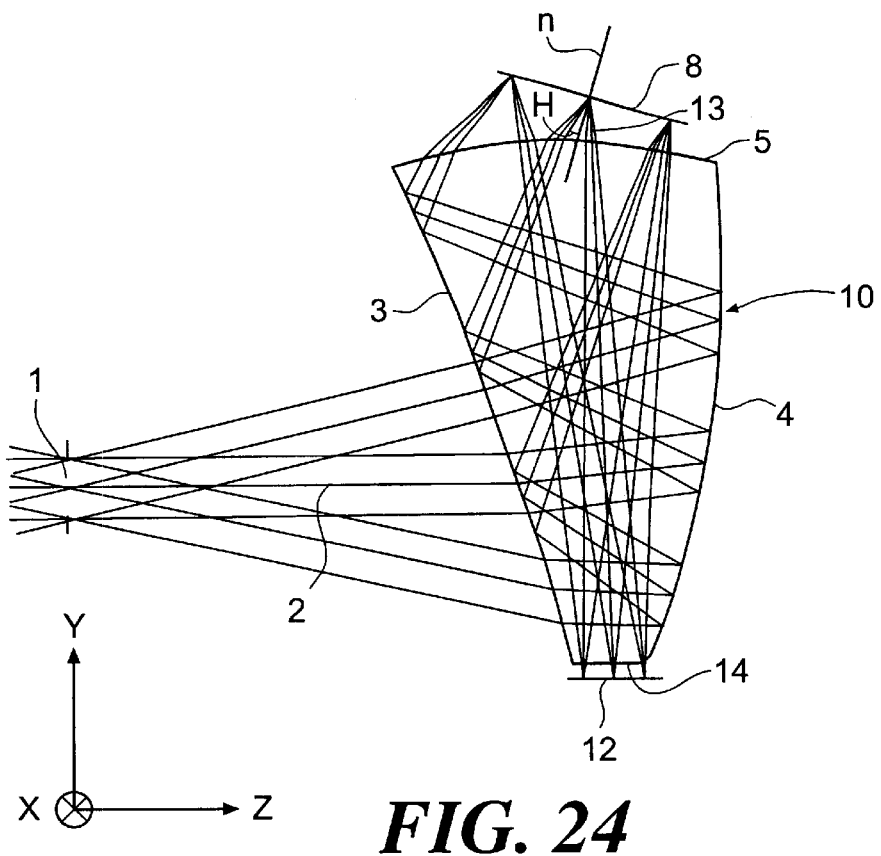
FIG. 24 is a sectional view of an optical system of an image display apparatus according to example 1 of numerical values of the present invention.

Next, examples 1–5 of specific numerical values according to the present invention will be described. In constituent parameters of each example described below, as shown in FIG. 24, the center of an exit pupil 1 of a decentered optical system 10 is defined as the origin of the optical system. An optical axis 2 is defined as the axial principal ray which passes through the center (origin) of the exit pupil 1. A Z-axis is taken in a direction in which light rays travel from the exit pupil 1 along the optical axis 2. A Y-axis is taken in a direction which extends through the center of the exit pupil 1 at right angles to the Z-axis in a plane in which light rays are bent by the decentered optical system 10. An X-axis is taken in a direction which extends through the center of the exit pupil 1 at right angles to both the Y- and Z-axes. The positive direction of the Z-axis is defined as a direction in which the Z-axis extends from the exit pupil 1 toward the decentered optical system 10. The positive direction of the Y-axis is defined as a direction in which the Y-axis extens from the optical axis 2 toward an image surface (image display device) 8. The positive direction of the X-axis is defined as a direction in which the X-axis constitutes a right-handed system in combination with the Y- and Z-axes. It should be noted that ray tracing is carried out in a direction in which light rays enter the decentered optical system 10 from the object side of the exit pupil 1 of the decentered optical system 10.

Each surface is given displacements in the X-, Y-, and Z-axis directions of the vertex position of the surface from the center of the exit pupil 1, which is the origin of the optical system 10, and tilt angles of the center axis of the surface (the Z-axis in the below equations (c) and (f) with respect to a three-dimensional surface and a rotationally symmetric aspherical surface, respectively) with respect to the X-, Y-, and Z-axes ($\alpha$, $\beta$ and $\gamma$ (°), respectively). In this case, positive $\alpha$ and $\beta$ mean counterclockwise rotation relative to the positive directions of the corresponding axes, and positive $\gamma$ means clockwise rotation relative to the positive direction of the Z-axis. In addition, the radius of curvature of each spherical surface, surface separation, the refractive index of each medium, and Abbe's number are given according to the conventional method.

The configuration of a three-dimensional surface which is a rotationally asymmetric surface is defined by the following equation. The Z-axis of the defining equation is the axis of the rotationally asymmetric surface.

$$Z = \Sigma_n \Sigma_m C_{nm} X^n Y^{n-m}$$

where $\Sigma_n$ indicates that n of $\Sigma$ is from 0 to k, and $\Sigma_m$ indicates that m of $\Sigma$ is from 0 to n.

In a case where a plane-symmetry three-dimensional surface (i.e. a three-dimensional surface having only one plane of symmetry) is defined by the equation expressing a three-dimensional surface, when symmetry produced by the plane of symmetry is to be obtained in the X-direction, all terms with odd-numbered powers of X are made zero (for example, the coefficients of the terms with odd-numbered powers of X are set equal to zero). To obtain symmetry produced by the plane of symmetry in the Y-direction, all terms with odd-numbered powers of Y are made zero (for example, the coefficients of the terms with odd-numbered powers of Y are set equal to zero).

Assuming that k=7 (polynomial of degree 7), for example, a plane-symmetry three-dimensional surface which is symmetric with respect to the X-direction is expressed by an expanded form of the above equation as follows:

$$Z = C_2 + C_3Y + C_4X + C_5Y^2 + C_6YX + C_7X^2 + C_8Y^3 + \quad (c)$$
$$C_9Y^2X + C_{10}YX^2 + C_{11}X^3 + C_{12}Y^4 + C_{13}Y^3X +$$
$$C_{14}Y^2X^2 + C_{15}YX^3 + C_{16}X^4 + C_{17}Y^5 + C_{18}Y^4X +$$
$$C_{19}Y^3X^2 + C_{20}Y^2X^3 + C_{21}YX^4 + C_{22}X^5 + C_{23}Y^6 +$$
$$C_{24}Y^5X + C_{25}Y^4X^2 + C_{26}Y^3X^3 + C_{27}Y^2X^4 +$$
$$C_{28}YX^5 + C_{29}X^6 + C_{30}Y^7 + C_{31}Y^6X + C_{32}Y^5X^2 +$$
$$C_{33}Y^4X^3 + C_{34}Y^3X^4 + C_{35}Y^2X^5 + C_{36}YX^6 + C_{37}X^7$$

In the above defining equation (c), the coefficients $C_4$, $C_6$, $C_9$, . . . of the terms with odd-numbered powers of X are set equal to zero (see examples described below). It should be noted that coefficients concerning aspherical surfaces which are not shown in the constituent parameters (shown below) are zero.

Plane-symmetry three-dimensional surfaces may also be defined by Zernike polynomials. That is, the configuration of a plane-symmetry three-dimensional surface may be defined by the following equation (d). The Z-axis of the defining equation (c) is the axis of Zernike polynomial.

$$X = R \times \cos(A)$$
$$Y = R \times \sin(A)$$
$$Z = D_2 + D_3 R\cos(A) + D_4 R\sin(A) + D_5 R^2\cos(2A) + \quad (d)$$
$$D_6(R^2 - 1) + D_7 R^2\sin(2A) + D_8 R^3\cos(3A) +$$
$$D_9(3R^3 - 2R)\cos(A) + D_{10}(3R^3 - 2R)\sin(A) +$$
$$D_{11}R^3\sin(3A) + D_{12}R^4\cos(4A) +$$
$$D_{13}(4R^4 - 3R^2)\cos(2A) + D_{14}(6R^4 - 6R^2 + 1) +$$
$$D_{15}(4R^4 - 3R^2)\sin(2A) + D_{16}R^4\sin(4A) +$$
$$D_{17}R^5\cos(5A) + D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) +$$
$$D_{21}(5R^5 - 4R^3)\sin(3A) + D_{22}R^5\sin(5A) +$$
$$D_{23}R^6\cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29}R^6\sin(6A)$$

It should be noted that the plane-symmetry three-dimensional surface in the above equation is expressed as a surface which is symmetric with respect to the X-direction. In the above equation, Dm (m is an integer equal to or larger than 2) are coefficients.

As an example of other expressions of surfaces usable in the present invention, the above defining equation ($Z = \Sigma_n \Sigma_m C_{nm} X^n Y^{n-m}$) may be expanded to express a surface which is symmetric with respect to the X-direction and in which k=7, as shown by the following equation (d) as in the case of equation (b):

$$Z = C_2 + C_3Y + C_4|X| + C_5Y^2 + C_6Y|X| + C_7X^2 + \quad (e)$$
$$C_8Y^3 + C_9Y^2|X| + C_{10}YX^2 + C_{11}|X^3| + C_{12}Y^4 +$$
$$C_{13}Y^3|X| + C_{14}Y^2X^2 + C_{15}Y|X^3| + C_{16}X^4 +$$
$$C_{17}Y^5 + C_{18}Y^4|X| + C_{19}Y^3X^2 + C_{20}Y^2|X^3| +$$
$$C_{21}YX^4 + C_{22}|X^5| + C_{23}Y^6 + C_{24}Y^5|X| +$$
$$C_{25}Y^4X^2 + C_{26}Y^3|X^3| + C_{27}Y^2X^4 + C_{28}Y|X^5| +$$
$$C_{29}X^6 + C_{30}Y^7 + C_{31}Y^6|X| + C_{32}Y^5X^2 +$$
$$C_{33}Y^4|X^3| + C_{34}Y^3X^4 + C_{35}Y^2|X^5| + C_{36}YX^6 +$$
$$C_{37}|X^7|$$

The configuration of a rotationally symmetric aspherical surface is defined by the following equation. The Z-axis of the defining equation is the axis of the rotationally symmetric aspherical surface.

$$Z = (Y^2/R) / \left[1 + \{1 - P(Y^2/R^2)\}^{1/2}\right] + \quad (f)$$
$$A_4 Y^4 + A_6 Y^6 + A_8 Y^8 + A_{10} Y^{10}$$

where Y is a direction perpendicular to Z; R is a paraxial radius of curvature; P is a conical coefficient; and $A_4$, $A_6$, $A_8$ and $A_{10}$ are aspherical coefficients.

In the constituent parameters described below, those terms concerning aspherical surfaces for which no data is shown are zero. The refractive index is expressed by the refractive index for the spectral d-line (wavelength: 587.56 nanometers). Lengths are given in millimeters.

Figure 25:
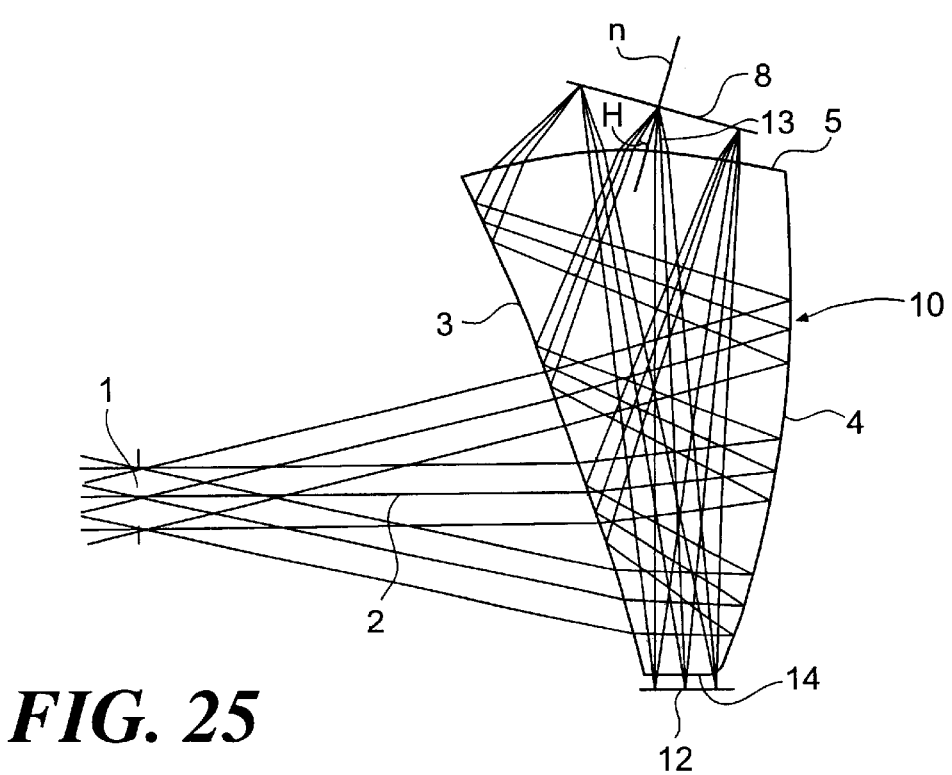
FIG. 25 is a sectional view of an optical system of an image display apparatus according to example 2 of numerical values of the present invention.
Figure 26:
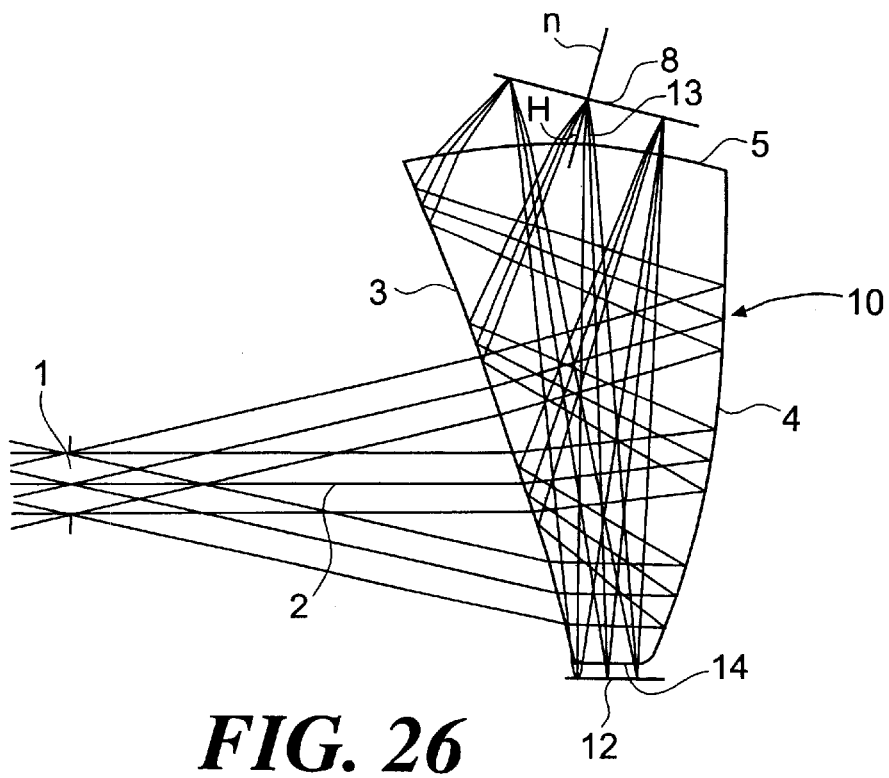
FIG. 26 is a sectional view of an optical system of an image display apparatus according to example 3 of numerical values of the present invention.
Figure 27:
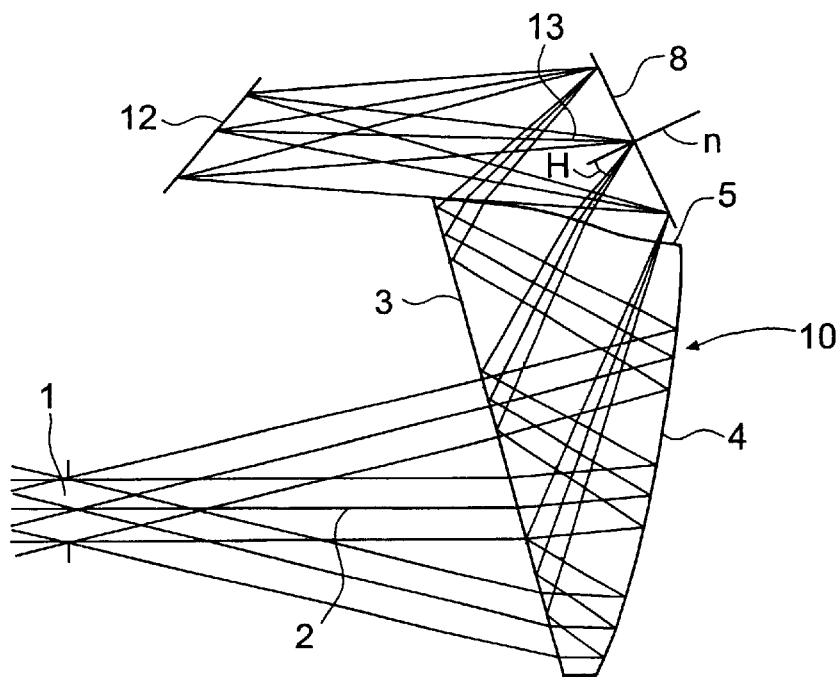
FIG. 27 is a sectional view of an optical system of an image display apparatus according to example 4 of numerical values of the present invention.
Figure 28:
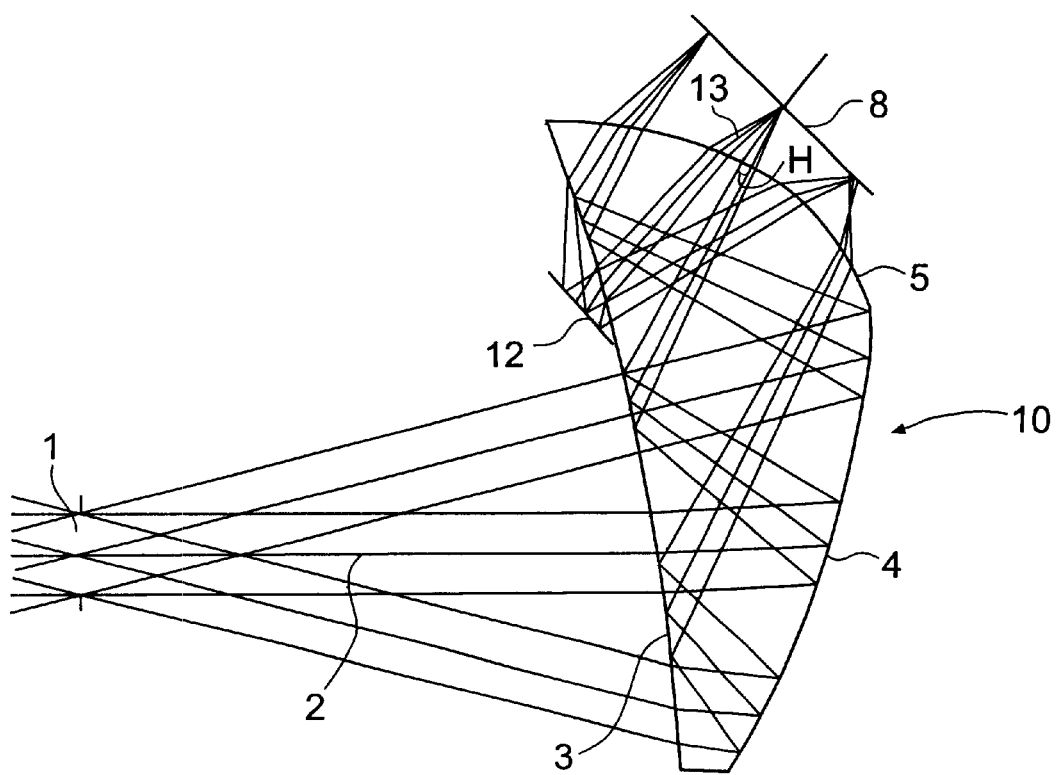
FIG. 28 is a sectional view of an optical system of an image display apparatus according to example 5 of numerical values of the present invention.

FIGS. 24–28 are sectional views of examples 1–5, taken along the YZ plane containing the optical axis 2 of the decentered optical system 10 of the image display apparatus. The decentered prism optical system 10 according to any of example 1–5 has three surfaces 3, 4 and 5 as in the case of FIG. 1. The space between the three surfaces 3, 4 and 5 is filled with a transparent medium having a refractive index larger than 1. A bundle of light rays from an object (not shown) first passes through the exit pupil 1 of the decentered optical system 10 along the optical axis 2 and enters the decentered optical system 10 through the first surface 3, which has both transmitting and reflecting actions. The incident light rays are reflected toward the exit pupil 1 by the second surface 4, which is disposed in a position remote from the exit pupil 1 and has only a reflecting action. The reflected rays are reflected by the first surface 3 so as to travel away from the exit pupil 1. The reflected rays pass through the third surface 5, which has only a transmitting action, and reach a display surface of a reflection-type LCD 8 arranged at the position of an image surface. The rays are regularly reflected by the display surface. In the cases of FIGS. 24–26, like FIG. 2, the reflected rays enter the decentered optical system 10 through the third surface 5, cross the decentered optical system 10, and exit from the decentered optical system 10 through a cutout surface 14 which is located opposite to the third surface 5 and at the intersection of the first surface 3 and the second surface 4. Then the rays reach a surface illuminant 12 (for example, ground glass illuminated form its back side by a point light source) arranged in front of the cutout surface 14. In the case of FIG. 27, like FIG. 1, the rays regularly reflected by the display surface of the reflection-type LCD 8 reach a surface illuminant 12 arranged on the side of the exit pupil 1 in a space between the third surface 5 and the reflection-type LCD 8. In the case of FIG. 28, like FIG. 3, the rays regularly reflected by the display surface of the reflection-type LCD 8 enter the decentered optical system 10 through the third surface 5, cross the optical system 10 near the intersection of the third surface 5 and the first surface 3, exit from the first surface 3 toward the exit pupil 1, and reach a surface illuminant 12 arranged in front of the first surface 3.

In the cases of FIG. 24 (example 1), FIG. 26 (example 3), FIG. 27 (example 4), FIG. 28 (example 5), the exit pupil 1 is conjugate to the surface illuminant 12. Therefore, the surface illuminant 12 may be in a circular form similar to the exit pupil 1. In the case of FIG. 25 (example 2), the exit pupil 1 and the surface illuminant 12 are conjugate to each other only in the Y-Z section, and not conjugate in the X-Z section. In example 2, therefore, a long surface illuminant 12 extending in the X-direction.

In examples 1, 2 and 5, the first surface 3 is a rotationally symmetry aspherical surface which is defined by the aforementioned equation (f) and decentered with its concave surface facing the pupil 1. In example 3, the first surface 3 is a three-dimensional surface defined by the aforementioned equation (c). In the example 4, the first surface 3 is a rotationally symmetric aspherical surface which is defined by the aforementioned equation (f) and decentered with its convex surface facing the pupil 1. In each of examples 1–5, the second surface 4 and the third surface 5 are three-dimensional surfaces defined by the aforementioned equation (c).

The reflection-type LCD 8 used in each example has a picture surface of a 0.7-inch diagonal type, which is 14.4 mm high and 10.7 mm wide. With respect to the field angle, in examples 1–3, the horizontal field angle is 33° and the vertical field angle is 25.1° and, in examples 4 and 5, the horizontal field angle 35° and the vertical field angle 26.6°. The diameter of the pupil is 4 mm in each example.

Constituent parameters of examples 1–5 are shown below. Surface numbers 7 and 8 following the image surface are, in examples 1–3, the third surface 5 and the cutout surface 14 and, in example 5, the third surface 5 and the first surface 3. The light source is the surface illuminant 12. In each of examples 1–5, the optical system is a non-telecentric optical systems with its entrance pupil being at a finite distance.

EXAMPLE 1

| Surface No. | Radius of curvature | Surface separation | Displacement and tilt | Refractive index | Abbe's No. |
|---|---|---|---|---|---|
| Object | ∞ | −1000.00 | | | |
| 1 | ∞ (pupil) | | | | |
| 2 | −167.90 (aspherical surface) | | (1) | 1.5254 | 56.2 |
| 3 | Three-dimensional surface (1) | | (2) | 1.5254 | 56.2 |
| 4 | −167.90 (aspherical surface) | | (1) | 1.5254 | 56.2 |
| 5 | Three-dimensional surface (2) | | (3) | | |
| 6 | ∞ (image surface) | | (4) | | |
| 7 | Three-dimensional surface (2) | | (3) | 1.5254 | 56.2 |
| 8 | ∞ | | (5) | | |
| 9 | ∞ (light source) | | (6) | | |

Coefficients concerning aspherical surfaces

Surface Nos. 2 and 4
P = 1
$A_4 = 1.3861 \times 10^{-6}$
$A_6 = -1.5957 \times 10^{-9}$ Three-dimensional surface (1)

| | | | | | |
|---|---|---|---|---|---|
| $C_5$ | $-7.5462 \times 10^{-3}$ | $C_7$ | $-7.8676 \times 10^{-3}$ | $C_8$ | $5.6453 \times 10^{-5}$ |
| $C_{10}$ | $2.7553 \times 10^{-5}$ | $C_{12}$ | $5.3969 \times 10^{-7}$ | $C_{14}$ | $6.0288 \times 10^{-7}$ |
| $C_{16}$ | $-3.2424 \times 10^{-7}$ | $C_{17}$ | $-3.6709 \times 10^{-8}$ | $C_{19}$ | $9.4121 \times 10^{-8}$ |
| $C_{21}$ | $-5.0850 \times 10^{-9}$ | | | | |

Three-dimensional surface (2)

| | | | | | |
|---|---|---|---|---|---|
| $C_5$ | $-1.2220 \times 10^{-2}$ | $C_7$ | $-1.3558 \times 10^{-2}$ | $C_8$ | $-2.5977 \times 10^{-4}$ |
| $C_{10}$ | $2.9678 \times 10^{-4}$ | $C_{14}$ | $5.5478 \times 10^{-6}$ | $C_{16}$ | $3.1550 \times 10^{-5}$ |
| $C_{17}$ | $2.6777 \times 10^{-6}$ | $C_{19}$ | $-1.7874 \times 10^{-6}$ | $C_{21}$ | $-3.9576 \times 10^{-7}$ |

Displacement and tilt (1)

| X | 0.00 | Y | 8.59 | Z | 27.10 |
|---|---|---|---|---|---|
| α | 21.17 | β | 0.00 | γ | 0.00 |

Displacement and tilt (2)

| X | 0.00 | Y | 1.39 | Z | 42.54 |
|---|---|---|---|---|---|
| α | −9.30 | β | 0.00 | γ | 0.00 |

Displacement and tilt (3)

| X | 0.00 | Y | 22.01 | Z | 32.70 |
|---|---|---|---|---|---|
| α | 90.03 | β | 0.00 | γ | 0.00 |

Displacement and tilt (4)

| X | 0.00 | Y | 24.99 | Z | 34.86 |
|---|---|---|---|---|---|
| α | 74.53 | β | 0.00 | γ | 0.00 |

Displacement and tilt (5)

| X | 0.00 | Y | −12.00 | Z | 32.00 |
|---|---|---|---|---|---|
| α | 90.00 | β | 0.00 | γ | 0.00 |

Displacement and tilt (6)

| X | 0.00 | Y | −13.00 | Z | 36.50 |
|---|---|---|---|---|---|
| α | 90.00 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object | ∞ | −1000.00 | | | |
| 1 | ∞ (pupil) | | | | |
| 2 | −168.57 (aspherical surface) | | (1) | 1.5254 | 56.2 |
| 3 | Three-dimensional surface (1) | | (2) | 1.5254 | 56.2 |
| 4 | −168.57 (aspherical surface) | | (1) | 1.5254 | 56.2 |
| 5 | Three-dimensional surface (2) | | (3) | | |
| 6 | ∞ (image surface) | | (4) | | |
| 7 | Three-dimensional surface (2) | | (3) | 1.5254 | 56.2 |
| 8 | ∞ | | (5) | | |
| 9 | ∞ (light source) | | (6) | | |

Coefficients concerning aspherical surfaces

Surface Nos. 2 and 4
P = 1
$A_4 = 9.2941 \times 10^{-7}$
$A_6 = -1.6509 \times 10^{-9}$ Three-dimensional surface (1)

| | | | | | |
|---|---|---|---|---|---|
| $C_5$ | $-7.5328 \times 10^{-3}$ | $C_7$ | $-7.8680 \times 10^{-3}$ | $C_8$ | $6.1807 \times 10^{-5}$ |
| $C_{10}$ | $2.1866 \times 10^{-5}$ | $C_{12}$ | $5.9433 \times 10^{-7}$ | $C_{14}$ | $4.5365 \times 10^{-7}$ |
| $C_{16}$ | $2.4863 \times 10^{-7}$ | $C_{17}$ | $-6.1413 \times 10^{-8}$ | $C_{19}$ | $1.1857 \times 10^{-7}$ |
| $C_{21}$ | $4.9232 \times 10^{-8}$ | | | | |

-continued

Three-dimensional surface (2)

| | | | | | |
|---|---|---|---|---|---|
| $C_5$ | $-1.2256 \times 10^{-2}$ | $C_7$ | $-6.5166 \times 10^{-3}$ | $C_8$ | $-2.0673 \times 10^{-4}$ |
| $C_{10}$ | $5.7020 \times 10^{-5}$ | $C_{14}$ | $-2.1224 \times 10^{-6}$ | $C_{16}$ | $-5.9028 \times 10^{-5}$ |
| $C_{17}$ | $1.7875 \times 10^{-6}$ | $C_{19}$ | $-1.7235 \times 10^{-6}$ | $C_{21}$ | $4.9652 \times 10^{-6}$ |

Displacement and tilt (1)

| X | 0.00 | Y | 8.19 | Z | 27.25 |
|---|---|---|---|---|---|
| α | 21.22 | β | 0.00 | γ | 0.00 |

Displacement and tilt (2)

| X | 0.00 | Y | 1.38 | Z | 42.43 |
|---|---|---|---|---|---|
| α | −8.85 | β | 0.00 | γ | 0.00 |

Displacement and tilt (3)

| X | 0.00 | Y | 21.93 | Z | 33.20 |
|---|---|---|---|---|---|
| α | 90.05 | β | 0.00 | γ | 0.00 |

Displacement and tilt (4)

| X | 0.00 | Y | 25.02 | Z | 35.56 |
|---|---|---|---|---|---|
| α | 73.13 | β | 0.00 | γ | 0.00 |

Displacement and tilt (5)

| X | 0.00 | Y | −12.00 | Z | 32.00 |
|---|---|---|---|---|---|
| α | 90.00 | β | 0.00 | γ | 0.00 |

Displacement and tilt (6)

| X | 0.00 | Y | −13.00 | Z | 36.50 |
|---|---|---|---|---|---|
| α | 90.00 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object | ∞ | −1000.00 | | | |
| 1 | ∞ (pupil) | | | | |
| 2 | Three-dimensional surface (1) | | (1) | 1.5254 | 56.2 |
| 3 | Three-dimensional surface (2) | | (2) | 1.5254 | 56.2 |
| 4 | Three-dimensional surface (1) | | (1) | 1.5254 | 56.2 |
| 5 | Three-dimensional surface (3) | | (3) | | |
| 6 | ∞ (image surface) | | (4) | | |
| 7 | Three-dimensional surface (3) | | (3) | 1.5254 | 56.2 |
| 8 | ∞ | | (5) | | |
| 9 | ∞ (light source) | | (6) | | |

Three-dimensional surface (1)

| | | | | | |
|---|---|---|---|---|---|
| $C_5$ | $-3.0943 \times 10^{-3}$ | $C_7$ | $-2.1692 \times 10^{-3}$ | $C_8$ | $-4.8306 \times 10^{-5}$ |
| $C_{10}$ | $-5.3490 \times 10^{-5}$ | $C_{12}$ | $1.4200 \times 10^{-6}$ | $C_{14}$ | $1.5139 \times 10^{-6}$ |
| $C_{16}$ | $-1.0861 \times 10^{-5}$ | $C_{17}$ | $1.5841 \times 10^{-7}$ | $C_{19}$ | $6.9496 \times 10^{-8}$ |
| $C_{21}$ | $-1.4837 \times 10^{-7}$ | | | | |

Three-dimensional surface (2)

| | | | | | |
|---|---|---|---|---|---|
| $C_5$ | $-7.6816 \times 10^{-3}$ | $C_7$ | $-7.6146 \times 10^{-3}$ | $C_8$ | $2.8189 \times 10^{-5}$ |
| $C_{10}$ | $-3.8271 \times 10^{-6}$ | $C_{12}$ | $-2.5770 \times 10^{-8}$ | $C_{14}$ | $8.8906 \times 10^{-7}$ |
| $C_{16}$ | $-2.7528 \times 10^{-6}$ | $C_{17}$ | $9.4659 \times 10^{-8}$ | $C_{19}$ | $8.1970 \times 10^{-8}$ |
| $C_{21}$ | $8.5439 \times 10^{-8}$ | | | | |

Three-dimensional surface (3)

| | | | | | |
|---|---|---|---|---|---|
| $C_5$ | $-1.2314 \times 10^{-2}$ | $C_7$ | $-1.3727 \times 10^{-2}$ | $C_8$ | $-3.0807 \times 10^{-4}$ |
| $C_{10}$ | $2.4329 \times 10^{-4}$ | $C_{14}$ | $7.0617 \times 10^{-6}$ | $C_{16}$ | $2.0688 \times 10^{-5}$ |
| $C_{17}$ | $2.8361 \times 10^{-6}$ | $C_{19}$ | $-1.7179 \times 10^{-6}$ | $C_{21}$ | $-5.4413 \times 10^{-7}$ |

Displacement and tilt (1)

| X | 0.00 | Y | 8.88 | Z | 26.99 |
|---|---|---|---|---|---|
| α | 21.35 | β | 0.00 | γ | 0.00 |

Displacement and tilt (2)

| X | 0.00 | Y | 1.43 | Z | 42.68 |
|---|---|---|---|---|---|
| α | −9.43 | β | 0.00 | γ | 0.00 |

Displacement and tilt (3)

| X | 0.00 | Y | 21.72 | Z | 32.14 |
|---|---|---|---|---|---|
| α | 89.25 | β | 0.00 | γ | 0.00 |

Displacement and tilt (4)

| X | 0.00 | Y | 24.52 | Z | 34.04 |
|---|---|---|---|---|---|
| α | 75.94 | β | 0.00 | γ | 0.00 |

Displacement and tilt (5)

| X | 0.00 | Y | −12.00 | Z | 32.00 |
|---|---|---|---|---|---|
| α | 90.00 | β | 0.00 | γ | 0.00 |

Displacement and tilt (6)

| X | 0.00 | Y | −13.00 | Z | 36.00 |
|---|---|---|---|---|---|
| α | 90.00 | β | 0.00 | γ | 0.00 |

EXAMPLE 4

| Surface No. | Radius of curvature | Surface separation | Displacement and tilt | Refractive index | Abbe's No. |
|---|---|---|---|---|---|
| Object | ∞ | −1000.00 | | | |
| 1 | ∞ (pupil) | | | | |
| 2 | 465.98 | | (1) | 1.5254 | 56.2 |
| 3 | Three-dimensional surface (1) | | (2) | 1.5254 | 56.2 |
| 4 | 465.98 | | (1) | 1.5254 | 56.2 |
| 5 | Three-dimensional surface (2) | | (3) | | |
| 6 | ∞ (image surface) | | (4) | | |
| 7 | ∞ (light source) | | (5) | | |

Coefficients concerning aspherical surfaces

Surface Nos. 2 and 4
P = 1
$A_4 = -3.5067 \times 10^{-6}$
$A_6 = 4.6627 \times 10^{-10}$

Three-dimensional surface (1)

| | | | | | |
|---|---|---|---|---|---|
| $C_5$ | $-5.9694 \times 10^{-3}$ | $C_7$ | $-6.5778 \times 10^{-3}$ | $C_8$ | $5.4922 \times 10^{-5}$ |
| $C_{10}$ | $6.5817 \times 10^{-5}$ | $C_{12}$ | $-2.8264 \times 10^{-6}$ | $C_{14}$ | $-5.5724 \times 10^{-6}$ |
| $C_{16}$ | $-1.0995 \times 10^{-6}$ | $C_{17}$ | $2.0234 \times 10^{-7}$ | $C_{19}$ | $9.3296 \times 10^{-8}$ |
| $C_{21}$ | $1.4712 \times 10^{-7}$ | | | | |

Three-dimensional surface (2)

| | | | | | |
|---|---|---|---|---|---|
| $C_5$ | $-5.4431 \times 10^{-4}$ | $C_7$ | $-5.9504 \times 10^{-3}$ | $C_8$ | $-7.1036 \times 10^{-4}$ |
| $C_{10}$ | $-3.6383 \times 10^{-4}$ | $C_{14}$ | $4.4298 \times 10^{-5}$ | $C_{16}$ | $-3.9713 \times 10^{-6}$ |
| $C_{19}$ | $-8.8974 \times 10^{-7}$ | $C_{21}$ | $-1.5926 \times 10^{-6}$ | | |

Displacement and tilt (1)

| X | 0.00 | Y | 7.27 | Z | 27.85 |
|---|---|---|---|---|---|
| α | 16.12 | β | 0.00 | γ | 0.00 |

Displacement and tilt (2)

| X | 0.00 | Y | 0.89 | Z | 38.74 |
|---|---|---|---|---|---|
| α | −12.19 | β | 0.00 | γ | 0.00 |

Displacement and tilt (3)

| X | 0.00 | Y | 18.55 | Z | 33.70 |
|---|---|---|---|---|---|
| α | 76.51 | β | 0.00 | γ | 0.00 |

Displacement and tilt (4)

| X | 0.00 | Y | 23.92 | Z | 37.47 |
|---|---|---|---|---|---|
| α | 26.70 | β | 0.00 | γ | 0.00 |

Displacement and tilt (5)

| X | 0.00 | Y | 24.74 | Z | 6.23 |
|---|---|---|---|---|---|
| α | −34.49 | β | 0.00 | γ | 0.00 |

EXAMPLE 5

| Surface No. | Radius of curvature | Surface separation | Displacement and tilt | Refractive index | Abbe's No. |
|---|---|---|---|---|---|
| Object | ∞ | −1000.00 | | | |
| 1 | ∞ (pupil) | | | | |
| 2 | −94.76 | | (1) | 1.5254 | 56.2 |
| 3 | Three-dimensional surface (1) | | (2) | 1.5254 | 56.2 |
| 4 | −94.76 | | (1) | 1.5254 | 56.2 |
| 5 | Three-dimensional surface (2) | | (3) | | |
| 6 | ∞ (image surface) | | (4) | | |
| 7 | Three-dimensional surface (2) | | (3) | 1.5254 | 56.2 |
| 8 | −94.76 | | (1) | | |
| 9 | ∞ (light source) | | (5) | | |

Coefficients concerning aspherical surfaces

Surface Nos. 2, 4 and 8
P = 1
$A_4 = 1.9079 \times 10^{-6}$
$A_6 = -1.8638 \times 10^{-9}$ Three-dimensional surface (1)

| | | | | | |
|---|---|---|---|---|---|
| $C_5$ | $-1.0488 \times 10^{-2}$ | $C_7$ | $-1.0606 \times 10^{-2}$ | $C_8$ | $4.0912 \times 10^{-5}$ |
| $C_{10}$ | $1.2549 \times 10^{-5}$ | $C_{14}$ | $-2.7265 \times 10^{-6}$ | $C_{16}$ | $-1.2752 \times 10^{-6}$ |

Three-dimensional surface (2)

| | | | | | |
|---|---|---|---|---|---|
| $C_5$ | $-3.5995 \times 10^{-2}$ | $C_7$ | $1.2635 \times 10^{-2}$ | $C_8$ | $1.0591 \times 10^{-3}$ |
| $C_{10}$ | $1.2029 \times 10^{-3}$ | $C_{14}$ | $3.6330 \times 10^{-6}$ | $C_{16}$ | $-7.5845 \times 10^{-5}$ |

Displacement and tilt (1)

| X | 0.00 | Y | 7.75 | Z | 27.83 |
|---|---|---|---|---|---|
| α | 13.48 | β | 0.00 | γ | 0.00 |

Displacement and tilt (2)

| X | 0.00 | Y | 0.47 | Z | 38.10 |
|---|---|---|---|---|---|
| α | −16.14 | β | 0.00 | γ | 0.00 |

Displacement and tilt (3)

| X | 0.00 | Y | 19.24 | Z | 33.85 |
|---|---|---|---|---|---|
| α | 63.60 | β | 0.00 | γ | 0.00 |

Displacement and tilt (4)

| X | 0.00 | Y | 22.06 | Z | 35.38 |
|---|---|---|---|---|---|
| α | 48.19 | β | 0.00 | γ | 0.00 |

Displacement and tilt (5)

| X | 0.00 | Y | 11.77 | Z | 25.69 |
|---|---|---|---|---|---|
| α | 45.00 | β | 0.00 | γ | 0.00 |

Transverse aberration graphs showing pupil aberrations of the surface illuminant 12 of the above-mentioned example 3 are shown in FIGS. 29(1)–29(3). FIG. 29(1) shows the transverse aberration of the bundle of light rays reaching the center of the exit pupil 1 from the center of the surface illuminant 12, FIG. 29(2) shows the transverse aberration of the bundle of light rays reaching the upper end of the exit pupil 1 from the right end of the surface illuminant 12, and FIG. 29(3) shows the transverse aberration of the bundle of light rays reaching the lower end of the exit pupil 1 from the left end of the surface illuminant 12.

The angles Θ relating to the conditional equations (1)–(3) of the foregoing example 1–5 are as follows:

| | Example 1 | Example 2 | Example 3 | Example 4 | Example 5 |
|---|---|---|---|---|---|
| Θ(°) | 20.5 | 20.5 | 20.1 | 28.1 | 13.5 |

Figure 43A:
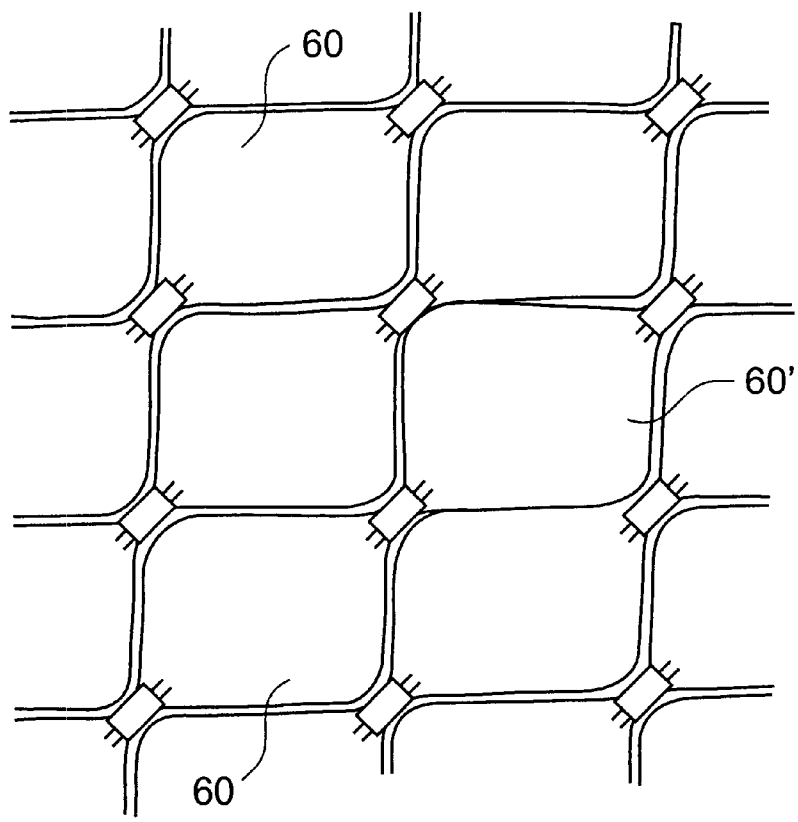
FIGS. 43(a) and 43(b) are view or explaining a structure of a known DMD.
Figure 43B:
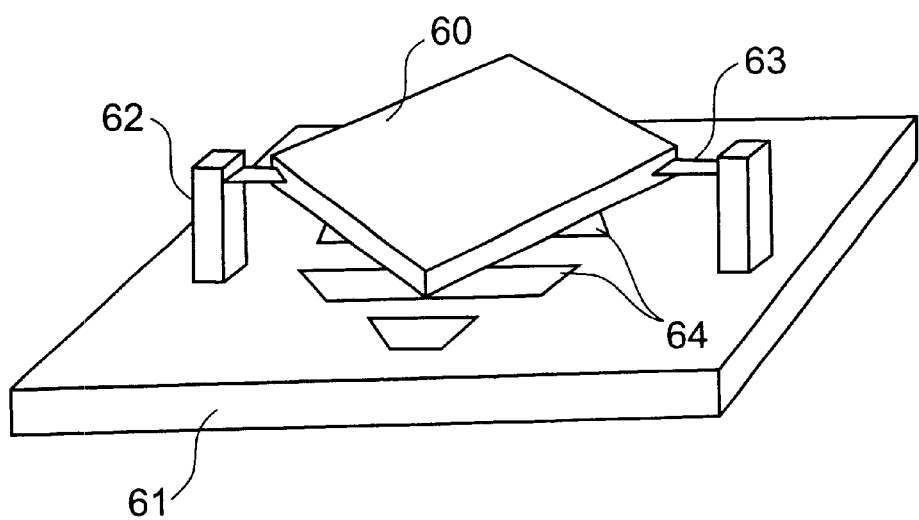

In the foregoing embodiments, the reflection-type LCD 8 is used as the reflection-type image display device, but naturally it may be replaced by a digital micro device (DMD) shown in FIG. 43 or the like.

Figure 30:
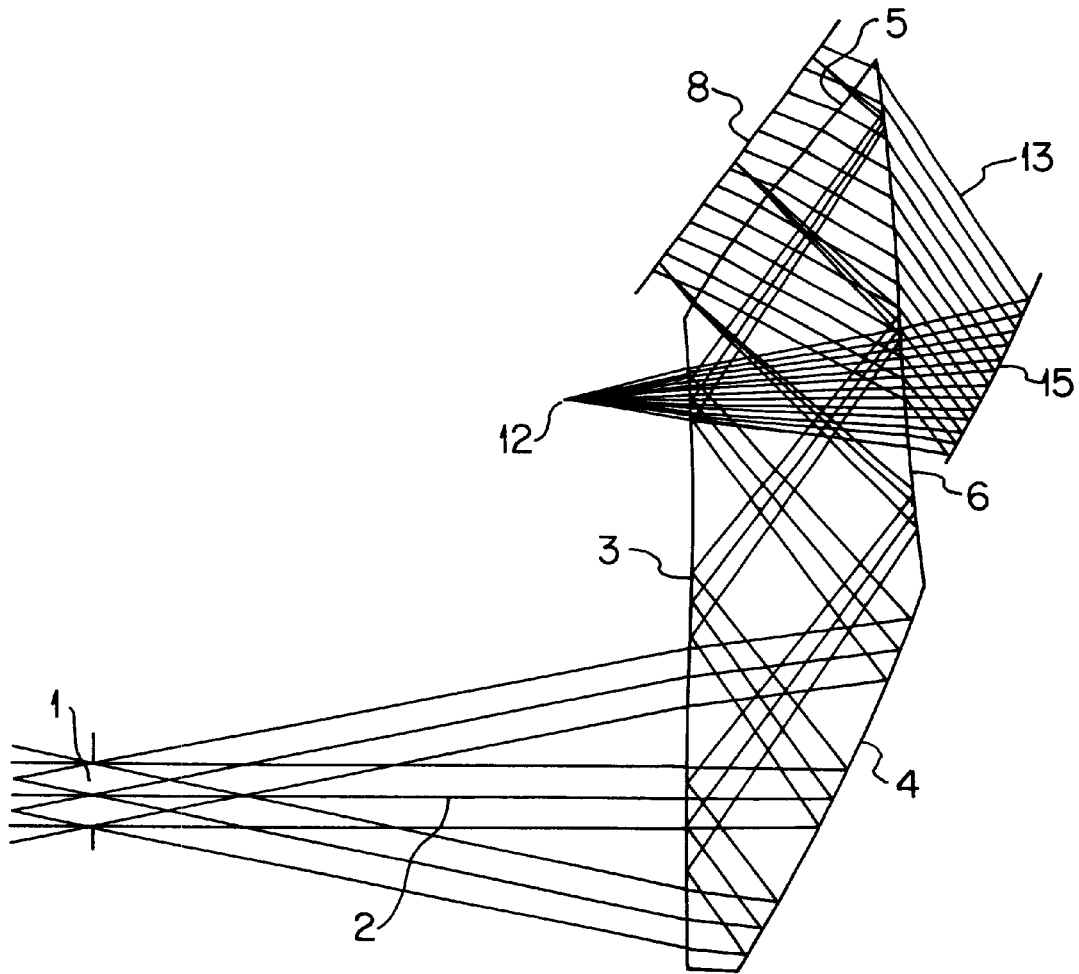
FIG. 30 is a sectional view showing an embodiment of arrangement of a light source when a decentered optical system shown in FIG. 17 is employed.

FIG. 30 shows one embodiment relating to the arrangement of a light source 12 when the decentered optical system 10 of FIG. 17 is used as an ocular optical system, though its numerical values are omitted. In this embodiment, the light source 12 is arranged at a position on the side of the exit pupil 1 in front of the first surface 3, and near the third surface 5. Illumination light 13 from the light source 12 enters the decentered optical system 10 through the first surface 3, and crosses the decentered optical system 10 so that the light 13 exits from the fourth surface 6 to the outside: that is, the illumination light 13 from the light source 12 goes through the decentered optical system 10 from the side of the exit pupil 1 to the opposite side. The illumination light 13 exiting from the fourth surface 6 is directed toward the reflection-type LCD 8 by a concave mirror 15, and enters again the decentered optical system 10 near the intersection of the fourth surface 6 and the third surface 5. The light 13 crosses the decentered optical system 10 and exits from the third surface 5 to the outside so that the display surface of the reflection-type LCD 8 is illuminated.

In any of the aforementioned embodiments, the reflection-type LCD 8 is used in the decentered optical system in the form of a non-telecentric optical system having an exit pupil at a finite distance. However, as will be described below, an image display device having no two-dimensional picture surface also can be used.

Figure 31:
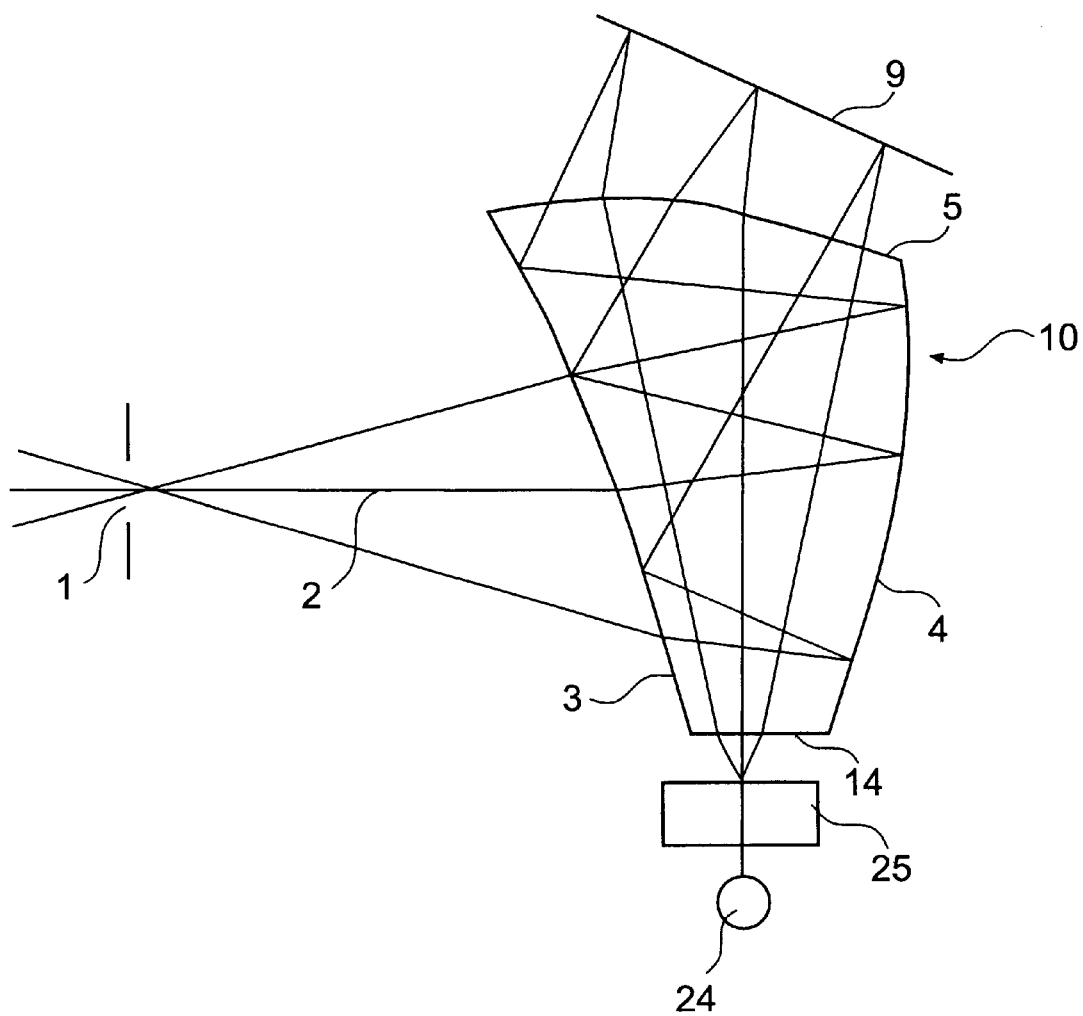
FIG. 31 is a sectional view showing another embodiment of the present invention.

For example, as shown in FIG. 31, an image display apparatus can be constructed by replacing the reflection-type LCD 8 of the image display apparatus shown in FIG. 2 with a plane mirror 9 and by replacing the light source 12 with an image display device 24 for forming a two-dimensional image by scanning and a scanning member 25.

Figure 32:
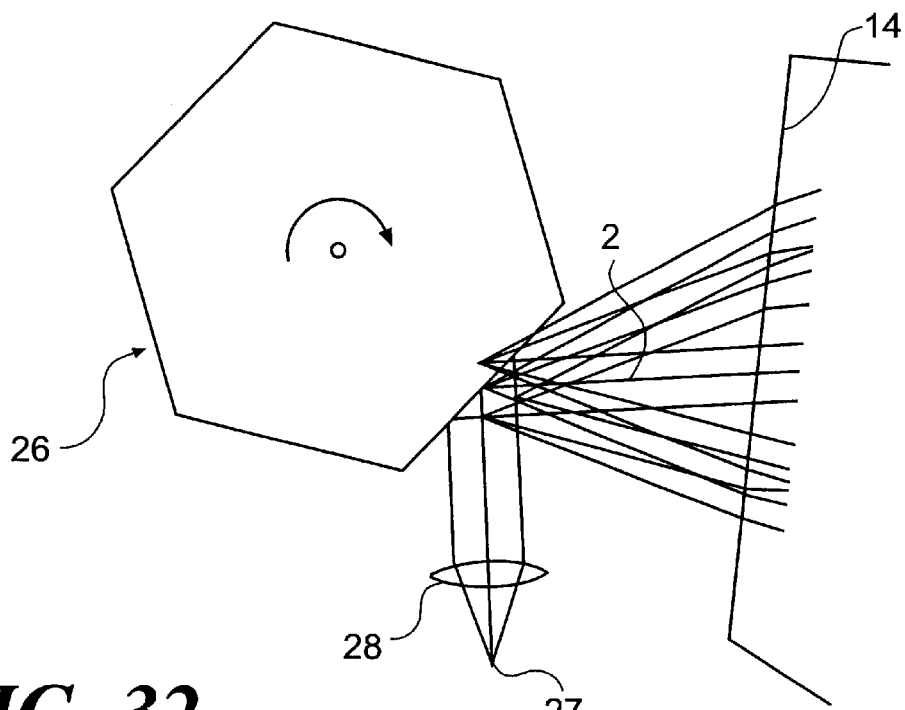
FIG. 32 is a view showing an example that a scanning member shown in FIG. 31 is constructed for one-dimensional scanning.

If this is constructed mainly for one-dimensional scanning, the scanning member 25 can be constructed by a polygon mirror 26, for example, as shown in FIG. 32. Further, the image display device 24 can be constructed by a one-dimensional image display device 27 (in which liquid crystal display picture elements, light emitting diode (LED) picture elements, and the like are arranged one-dimensionally) and a collimator lens 28 for making light rays parallel. In this construction, the entrance pupil of the decentered optical system 10 is positioned approximately on one of rotationally symmetric reflecting surfaces of this polygon mirror 26. A two-dimensional image can be formed by scanning a bundle of light rays in a direction perpendicular to the picture element array of the one-dimensional image display device 27.

Figure 33:
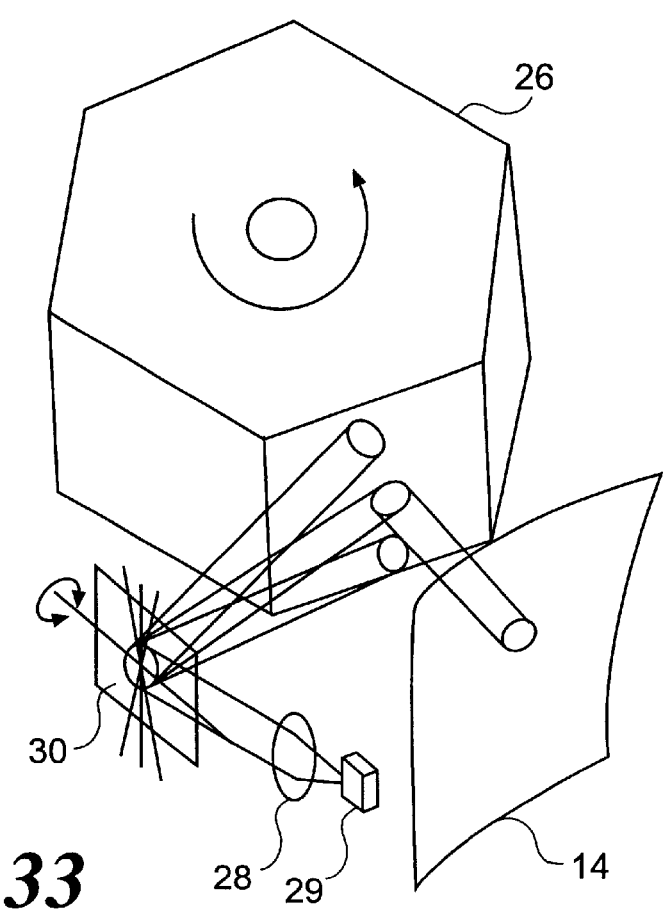
FIG. 33 is a view showing an example that a scanning member shown in FIG. 31 is constructed for two-dimensional scanning.

On the other hand, if it is constructed mainly for two-dimensional scanning, for example, as shown in FIG. 33, the one-dimensional image display device 27 may be replaced by a picture element light source 29 which displays one picture element. A galvano-mirror 30 is arranged so as to scan in a direction perpendicular to the scanning direction of the polygon mirror 26. This galvano-mirror 30 requires only a scanning function and may be replaced by a polygon mirror or the like.

In the above embodiments, the optical elements, such as the light source 12, the reflection-type LCD 8, the polygon mirror 26 and the plane mirror 9, emit a bundle of effective light rays forming the entrance pupil, and a bundle of other light rays having a larger numerical aperture. If the latter bundle of light rays is led to an eye of an observer, a ghost will occur. In order to prevent the ghost, it is desirable to arrange in the optical path formed by each of these optical elements an element (hereafter called a "numerical aperture reducing element") for restricting the numerical aperture of the bundle of light rays. Particularly, it is effective that this numerical aperture reducing element is arranged in the optical path between the decentered optical system 10 and one of the aforementioned optical elements. Examples of this numerical aperture reducing element are a louver optical device 16a and an optical fiber plate 16b, as described below.

Examples of the louver optical device 16a are shown in FIGS. 34(a) and 34(b). The louver optical device 16a is formed by periodically inserting minute light-blocking walls 18 in a transparent film 17. The light of an incident angle not included in a certain range is absorbed by the light-blocking walls 18 and can not exit. Furthermore, by changing the angle of the light-blocking walls 18, the incident angle for the maximum transmission can be changed. FIGS. 35(a) and 35(b) how the transmittance distributions of the louver optical device 16a when the light rays are incident from the direction indicated by arrow marks in FIGS. 34(a) and 34(b), respectively.

When the louver optical device 16a is inserted, for example, between the light source 12 and the reflection-type LCD 8 in FIG. 1, the numerical aperture of the bundle of light rays emitted from the light source 12 is restricted by the louver optical device 16a. Then, the bundle of light rays is reflected by the reflection-type LCD 8 and directed to the decentered optical system 10. It is assumed that the bundle of light rays having the numerical aperture producing the ghost has an incident angle equal to or larger than a critical incident angle a. If the louver optical device 16 has a transmittance distribution as shown in FIG. 35(a), in which the bundle of light rays having an incident angles equal to or larger than the critical angle a cannot be transmitted, the ghost can be prevented.

In each decentered optical system 10 as described in the above embodiments, the respective optical action surfaces are not co-axial, and the configuration of the surface is rotationally asymmetric. Therefore, the bundle of light rays having a large numerical aperture producing the ghost may not be symmetric with respect to the incident angle 0 as shown in FIG. 35(a). In such a case, it is desirable to use the louver optical device 16a in which the minute light-blocking walls 18 in the transparent film 17 are inclined at a predetermined angle, as shown in FIG. 34(b). For example, in the case of the embodiment shown in FIG. 1, the bundle of light rays emitted from the reflection-type LCD 8 is obliquely incident on the third surface 5 of the decentered optical system 10, pointing to the first surface 3. If the louver optical device 16a shown in FIG. 34(b) is arranged between the reflection-type LCD 8 and the third surface 5, the transmittance distribution shifts as shown in FIG. 35(b), so that only the bundle of light rays having a large numerical aperture producing the ghost can be reduced without losing the amount of light in the bundle of effective light rays.

Figure 36:
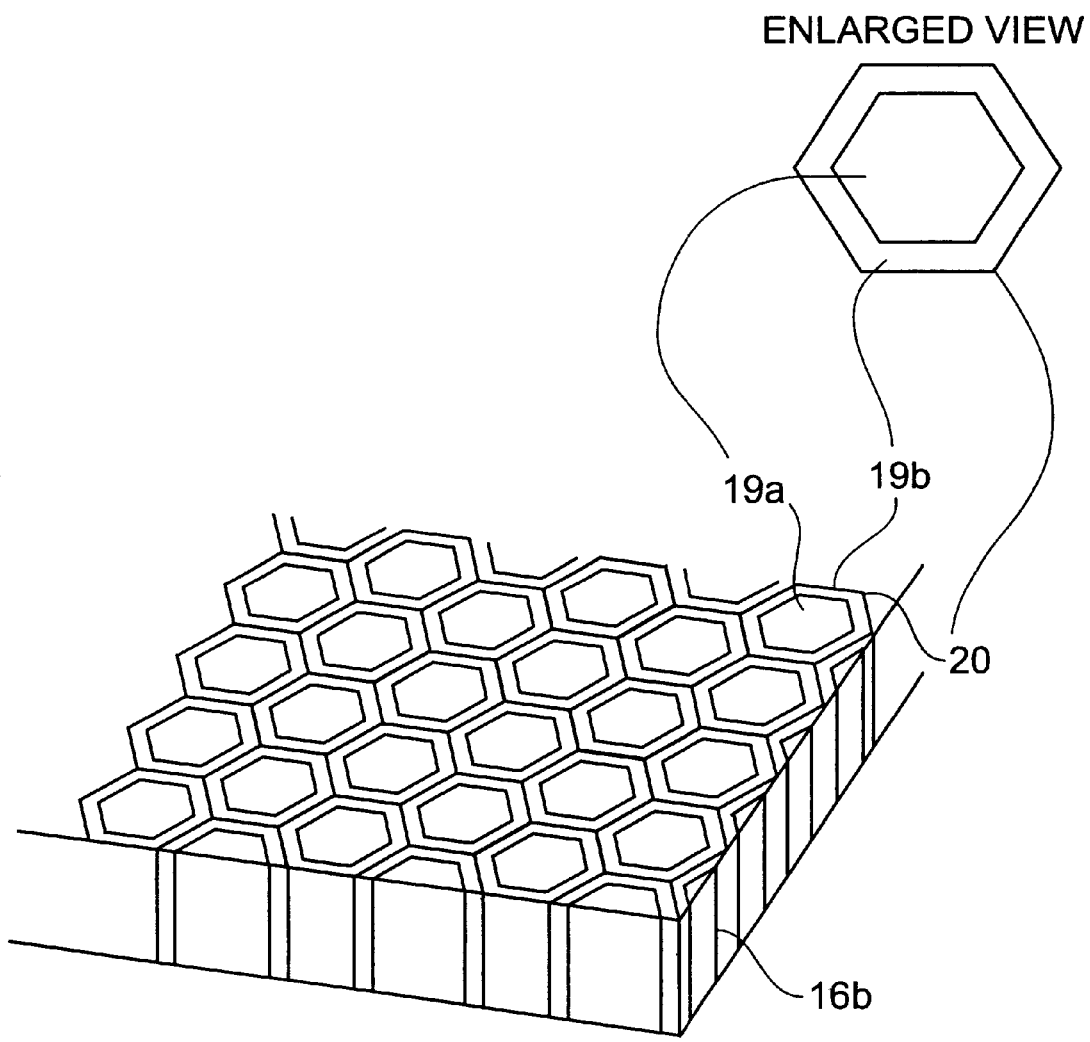
FIG. 36 is a view showing an optical fiber plate.

Instead of this louver optical device 16a, the optical fiber plate 16b in which optical fibers are bundled and cut in a plate shape can be used. An example of the structure of this optical fiber plate 16b is enlargedly shown in FIG. 36. The optical fiber plate 16b comprises a large number of optical fibers closely bundled. Each optical fiber comprises core glass 19a, clad glass 19b surrounding the core glass 19a, and an absorbing member 20 covering the outer periphery of the clad glass 19b, and has a predetermined numerical aperture. The bundle of light rays of a numerical aperture equal to or larger than the numerical aperture determined by the numerical aperture of the optical fiber passes through the wall of the optical fiber and is absorbed by the absorbing member 20. Thus, the fiber plate 16b has the same function as the aforementioned louver optical system 16a.

Incidentally, it is possible to construct an image display apparatus for a single eye by preparing a combination of an ocular optical system according to the present invention, arranged as described above, and an image display device. Alternatively, it is possible to construct an image display apparatus for both eyes by preparing a pair of such combinations, and supporting them apart from each other by the inter pupillary distance, i.e. the distance between the two eyes. In this way, it is possible to form a stationary or portable image display apparatus which enables the observer to see with a single eye or both eyes.

Figure 37:
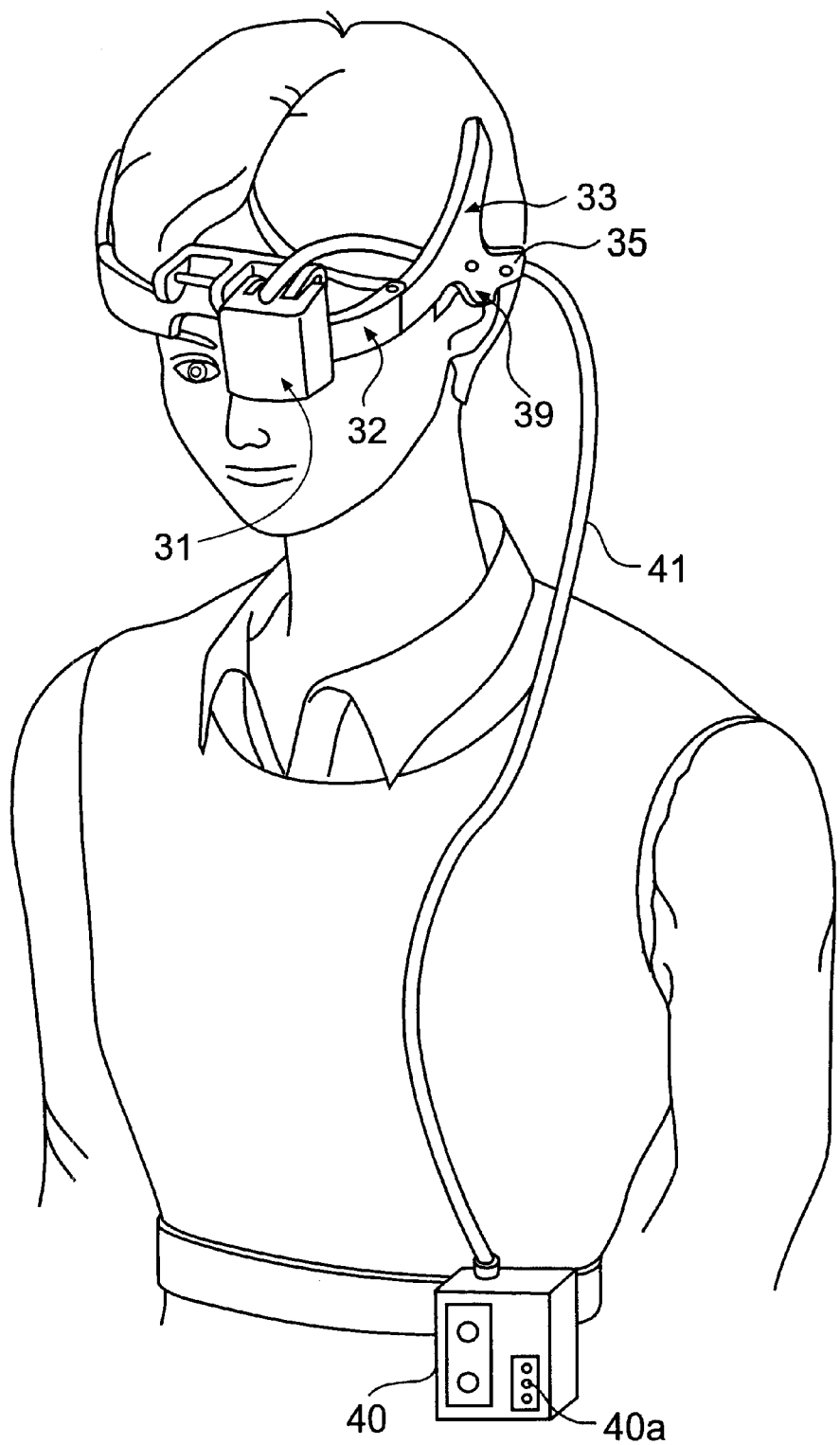
FIG. 37 is a view showing a state that the image display apparatus according to the present invention is constructed for a single eye.
Figure 38:
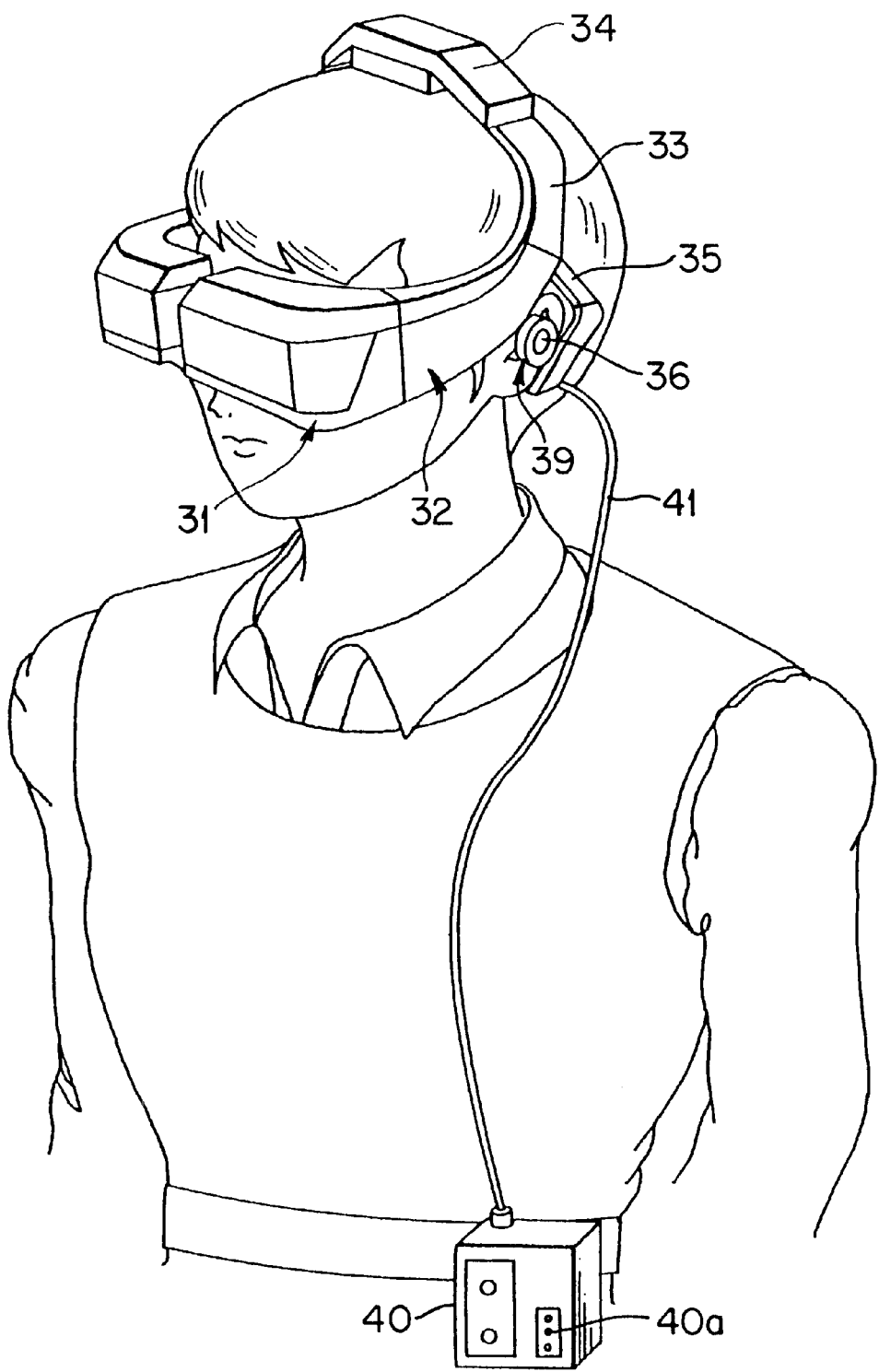
FIG. 38 is a view showing a state that the image display apparatus according to the present invention is constructed for both eyes.

FIG. 37 shows an image display apparatus designed for a single eye (in this case, the apparatus is designed for the left eye), and FIG. 38 shows an image display apparatus designed for both eyes. In FIGS. 37 and 38, reference numeral 31 denotes a display apparatus body unit. In the case of FIG. 37, the display apparatus body unit 31 is supported by a support member via the observer's head such that the display apparatus body unit 31 is held in front of the observer's left eye. In the case of FIG. 38, the display apparatus body unit 31 is supported by a support member via the observer's head such that the display apparatus body unit 31 is held in front of both the observer's eyes. The support member has a pair of left and right front frames 32 each joined at one end thereof to the display apparatus body unit 31. The left and right front frames 32 extend from the observer's temples to the upper portions of his/her ears, respectively. A pair of left and right rear frames 33 are joined to the other ends of the left and right front frames 32, respectively, and extend over the left and right side portions of the observer's head. In the case of FIG. 38, the support member further has a top frame 34 joined at both ends thereof to the other ends of the left and right rear frames 33, respectively, such that the top frame 34 is supported by the top of the observer's head.

A rear plate 35 is joined to one front frame 32 near the joint to the rear frame 33. The rear plate 35 is formed from an elastic member, e.g. a metal leaf spring. In the case of FIG. 38, a rear cover 36, which constitutes a part of the support member, is joined to the rear plate 35 such that the rear cover 36 can support the apparatus at a position behind the observer's ear in a region extending from the back part of the head to the base of the neck. A speaker 39 is mounted inside the rear plate 35 or the rear cover 36 at a position corresponding to the observer's ear.

A cable 41 for transmitting external image and sound signals is led out from the display apparatus body unit 31. In the case of FIG. 38, the cable 41 extends through the top frame 34, the rear frames 33, the front frames 32 and the rear plate 35 and projects to the outside from the rear end of the rear cover 36. In the case of FIG. 37, the cable 41 projects from the rear end of the rear plate 35. The cable 41 is connected to a video reproducing unit 40. It should be noted that reference numeral 40a denotes a switch and volume control part of the video reproducing unit 40.

The cable 41 may have a jack and plug arrangement attached to the distal end thereof so that the cable 41 can be detachably connected to an existing video deck. The cable 41 may also be connected to a TV signal receiving tuner so as to enable the user to enjoy watching TV. Alternatively, the cable 41 may be connected to a computer to receive computer graphic images or message images or the like from the computer. To eliminate the bothersome cord, the image display apparatus may be arranged to receive external radio signals through an antenna connected thereto.

As apparent from the foregoing descriptions, according to the present invention, the ocular optical system comprises a decentered optical system having at least one decentered surface which is a back-coated reflecting surface, the image display device comprises a reflection-type image display device for displaying an image by reflection of illumination light, and the illumination means for forming the illumination light is arranged outside the display optical path between the reflection-type image display device and the eye point of the observer. Accordingly, a small, light weight and bright image display apparatus can be attained, which has high optical performance by using the reflection-type LCD and the decentered optical system.

What is claimed is:

1. An image display apparatus, comprising:

an image display device comprising a reflection-type image display device which displays an image by reflection of illumination light;

an ocular optical system which leads an image formed by the image display device to an eye point of an observer without forming an intermediate image so that the image can be observed as a virtual image, the ocular optical system comprising a decentered optical system; and illumination means, arranged outside an optical path between the reflection-type image display device and the eye point of the observer, for forming the illumination light, wherein the decentered optical system comprises at least one reflecting surface which is a rotationally asymmetric surface having no axis of rotational symmetry, wherein the rotationally asymmetric surface is a plane-symmetry three-dimensional surface having only one plane of symmetry.

2. The image display apparatus according to claim 1, wherein the decentered optical system has at least an entrance surface, said reflecting surface and an exit surface which surround a medium having a refractive index larger than 1, and wherein said reflecting surface is a decentered curved surface of a back-coated reflecting mirror.

3. The image display apparatus according to claim 1, wherein the reflection-type image display device has a display surface, and wherein the illumination means is arranged such that an incident angle of the illumination light with respect to the display surface of the reflection-type image display device equals approximately an exit angle of a principal ray that is display light which exits from said reflection-type image display device.

4. The image display apparatus according to claim 1, wherein the illumination means is arranged at a position which is approximately conjugate with a position of an entrance pupil of the decentered optical system.

5. The image display apparatus according to claim 1, wherein the illumination means is arranged at a position in at least one of a first space between the reflection-type image display device and the decentered optical system, and a second space surrounding the first space, the position being outside the optical path so that the display light is not blocked.

6. The image display apparatus according to claim 1, wherein the reflection-type image display device has a display surface, and wherein the illumination means is arranged at a position such that the display surface of the reflection-type image display device can be illuminated by the illumination light transmitted in at least one of the following ways: (a) through a part of the decentered optical system and (b) in a direction within the decentered optical system, where the display light from the reflection-type image display device will not pass.

7. The image display apparatus according to claim 1, wherein a numerical aperture reducing member is arranged between said illuminating means and said decentered optical system to prevent a ghost.

8. The image display apparatus according to claim 1, comprising a pair of the image display devices for right and left eyes, and a pair of the ocular optical systems for right and left eyes.

9. The image display apparatus according to claim 1, further comprising supporting means for supporting the image display apparatus via a head of the observer so that the image display apparatus is positioned in front of a face of the observer.

10. An image display apparatus, comprising:

an image display device; and an ocular optical system which leads an image formed by the image display device to an eye point of an observer without forming an intermediate image so that the image can be observed as a virtual image, the ocular optical system comprising a decentered optical system having at least one decentered back-coated reflecting surface, and the decentered optical system being a non-telecentric optical system, wherein the image display device comprises a scanning member for at least one of one-dimensional scanning and two-dimensional scanning, and illuminating means formed so that a two-dimensional image is formed by the scanning of said scanning member, and wherein a numerical aperture reducing member is arranged between the illuminating means and the decentered optical system to prevent a ghost.

11. An image display apparatus, comprising:

an image display device; and an ocular optical system which leads an image formed by the image display device to an eye point of an observer without forming an intermediate image so that the image can be observed as a virtual image, the ocular optical system comprising a decentered optical system, wherein the decentered optical system has at least an entrance surface, a reflecting surface and an exit surface which surround a medium having a refractive index larger than 1, and wherein said reflecting surface is a decentered curved surface of a back-coated reflecting mirror, wherein the image display device comprises a scanning member for at least one of one-dimensional scanning and two-dimensional scanning, and illuminating means formed so that a two-dimensional image is formed by the scanning of said scanning member, and wherein a numerical aperture reducing member is arranged between the illuminating means and the decentered optical system to prevent a ghost.

12. An image display apparatus, comprising:

an image display device; and an ocular optical system which leads an image formed by the image display device to an eye point of an observer without forming an intermediate image so that the image can be observed as a virtual image, the ocular optical system comprising a decentered optical system having at least one decentered back-coated reflecting surface, and the decentered optical system being a non-telecentric optical system, wherein the image display device comprises a reflection-type image display device which displays an image by reflection of illumination light, and wherein illumination means for forming the illumination light is arranged outside an optical path between the reflection-type image display device and the eye point of the observer, and wherein a numerical aperture reducing member is arranged between said illuminating means and said decentered optical system to prevent a ghost.

13. An image display apparatus, comprising:

an image display device; and an ocular optical system which leads an image formed by the image display device to an eye point of an observer without forming an intermediate image so that the image can be observed as a virtual image, the ocular optical system comprising a decentered optical system, wherein the decentered optical system has at least an entrance surface, a reflecting surface and an exit surface which surround a medium having a refractive index larger than 1, and wherein said reflecting surface is a decentered curved surface of a back-coated reflecting mirror, wherein the image display device comprises a reflection-type image display device which displays an image by reflection of illumination light, and wherein illumination means for forming the illumination light is arranged outside an optical path between the reflection-type image display device and the eye point of the observer, and wherein a numerical aperture reducing member is arranged between said illuminating means and said decentered optical system to prevent a ghost.

14. An image display apparatus, comprising:

an image display device comprising a reflection-type image display device which displays an image by reflection of illumination light;

an ocular optical system which leads an image formed by the image display device to an eye point of an observer without forming an intermediate image so that the image can be observed as a virtual image, the ocular optical system comprising a decentered optical system; and an illuminator arranged outside an optical path between the reflection-type image display device and the eye point of the observer, wherein the decentered optical system comprises at least one reflecting surface which is a rotationally asymmetric surface having no axis of rotational symmetry, wherein the rotationally asymmetric surface is a plane-symmetry three-dimensional surface having only one plane of symmetry.

15. The image display apparatus according to claim 14, wherein the decentered optical system has at least an entrance surface, said reflecting surface and an exit surface which surround a medium having a refractive index larger than 1, and wherein said reflecting surface is a decentered curved surface of a back-coated reflecting mirror.

16. The image display apparatus according to claim 14, wherein the reflection-type image display device has a display surface, and wherein the illuminator is arranged such that an incident angle of the illumination light with respect to the display surface of the reflection-type image display device equals approximately to an exit angle of a principal ray in display light which exits from said reflection-type image display device.

17. The image display apparatus according to claim 14, wherein the illuminator is arranged at a position which is approximately conjugate with a position of an entrance pupil of the decentered optical system.

18. The image display apparatus according to claim 14, wherein the illuminator is arranged at a position in at least one of a first space between the reflection-type image display device and the decentered optical system, and a second space surrounding the first space, the position being outside the optical path so that the display light is not blocked.

19. The image display apparatus according to claim 14, wherein the reflection-type image display device has a display surface, and wherein the illuminator is arranged at a position such that the display surface of the reflection-type image display device can be illuminated by a illumination light emitted from the illuminator and transmitted in at least one of the following ways: (a) through a part of the decentered optical system and (b) in a direction within the decentered optical system, where the display light from the reflection-type image display device will not pass.

20. The image display apparatus according to claim 14, wherein a numerical aperture reducing member is arranged between said illuminator and said decentered optical system to prevent a ghost.

21. The image display apparatus according to claim 14 comprising a pair of the image display device for right and left eyes, and a pair of the ocular optical system for right and left eyes.

22. The image display apparatus according to claim 14, further comprising a supporting member for supporting the image display apparatus via a head of the observer so that the image display apparatus is positioned in front of a face of the observer.

* * * * *